(12) United States Patent
Matsumoto et al.

(10) Patent No.: US 9,246,182 B2
(45) Date of Patent: Jan. 26, 2016

(54) POWER GENERATION CONTROL DEVICE AND POWER GENERATION CONTROL METHOD FOR FUEL CELL

(75) Inventors: Michihiko Matsumoto, Yokohama (JP); Keisuke Suzuki, Fujisawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 40 days.

(21) Appl. No.: 13/127,148

(22) PCT Filed: Oct. 28, 2009

(86) PCT No.: PCT/JP2009/068464
§ 371 (c)(1),
(2), (4) Date: May 2, 2011

(87) PCT Pub. No.: WO2010/053027
PCT Pub. Date: May 14, 2010

(65) Prior Publication Data
US 2011/0217608 A1        Sep. 8, 2011

(30) Foreign Application Priority Data
Nov. 4, 2008    (JP) ................................ 2008-283149

(51) Int. Cl.
*H01M 8/04*        (2006.01)
*H01M 8/10*        (2006.01)

(52) U.S. Cl.
CPC ........ *H01M 8/04619* (2013.01); *H01M 8/0432* (2013.01); *H01M 8/0491* (2013.01); *H01M 8/04388* (2013.01); *H01M 8/04395* (2013.01); *H01M 2008/1095* (2013.01); *H01M 2250/20* (2013.01); *Y02E 60/50* (2013.01); *Y02T 90/32* (2013.01)

(58) Field of Classification Search
CPC .......... H01M 8/04619; H01M 8/0491; H01M 2250/20; H01M 2008/1095; Y02E 60/50; Y02T 90/32
USPC .......................................................... 429/428
See application file for complete search history.

(56) References Cited

U.S. PATENT DOCUMENTS

2004/0080297 A1*    4/2004    Leboe .......................... 320/101
2007/0072024 A1     3/2007    Ko et al.
(Continued)

FOREIGN PATENT DOCUMENTS

DE        101 09 151 A1       9/2002
EP        1 513 209 A2        3/2005
(Continued)

OTHER PUBLICATIONS

European Extended Search Report, Mar. 11, 2015, 8 pages.

*Primary Examiner* — Gary Harris
(74) *Attorney, Agent, or Firm* — Foley & Lardner LLP

(57) ABSTRACT

A power generation control device 3 for a fuel cell 1 of the present invention comprises: a target generated power calculating unit 31 configured to calculate target generated power of the fuel cell 1, based on a load condition of an electrical load device connected to the fuel cell 1; a target generated current calculating unit 34 configured to calculate a target generated current to be taken out of the fuel cell 1, based on the target generated power; a current change rate limit value calculating unit 35 configured to calculate a limit value for a rate of change in the target generated current, based on an operating condition parameter correlated with an operating temperature of the fuel cell 1; and a current limiting unit 37 configured to limit the target generated current so that the rate of change in the target generated current does not exceed the limit value calculated by the current change rate limit value calculating unit 35.

11 Claims, 15 Drawing Sheets

(56) References Cited

U.S. PATENT DOCUMENTS

| | | | |
|---|---|---|---|
| 2007/0072033 A1 | 3/2007 | Choi et al. | |
| 2007/0075587 A1 | 4/2007 | Kim et al. | |
| 2007/0080668 A1* | 4/2007 | Al-Anbuky et al. | 320/136 |
| 2008/0102326 A1* | 5/2008 | Falta | 429/13 |

FOREIGN PATENT DOCUMENTS

| | | | |
|---|---|---|---|
| JP | 5 151-983 A | | 6/1993 |
| JP | 7-57753 A | | 3/1995 |
| JP | 2005-85622 A | | 3/2005 |
| JP | 2006-100095 A | | 4/2006 |
| JP | 2006-147234 A | | 6/2006 |
| JP | 2007-194223 A | | 8/2007 |
| JP | 2007194223 A | * | 8/2007 |
| JP | 2007-227160 A | | 9/2007 |
| JP | 2008-204957 A | | 9/2008 |
| RU | 2 239 931 C2 | | 11/2004 |
| RU | 2 327 256 C1 | | 6/2008 |
| RU | 2 327 259 C1 | | 6/2008 |
| RU | 2 334 308 C2 | | 9/2008 |

* cited by examiner

POWER GENERATION CONTROL DEVICE AND POWER GENERATION CONTROL METHOD FOR FUEL CELL

TECHNICAL FIELD

The present invention relates to a power generation control device and a power generation control method for a fuel cell configured to generate power through supply of a fuel gas and an oxidant gas.

BACKGROUND ART

A technique described in the following Patent Document 1 has heretofore been known as a power generation control device for a fuel cell. In the power generation control device described in the Patent Document 1, a response delay of a fuel cell due to gas supply shortage in a transient state and the like are taken into consideration. Specifically, a rate of change in a current taken out of the fuel cell is limited to a rate which can be followed by the fuel cell, so as to suppress a decrease in power generation efficiency of the fuel cell.

PRIOR ART DOCUMENT

Patent Document

Patent Document 1: Japanese Patent Application Publication No. Hei 5-151983

SUMMARY OF THE INVENTION

Problem to be Solved by the Invention

In the meantime, besides the gas supply shortage, one of the possible factors of the decrease in power generation efficiency of the fuel cell is as below. Specifically, when a current is rapidly taken out of the fuel cell in a short time under a low-temperature environment, water clogging occurs in pores of a cathode catalytic layer, for example, and thereby oxygen diffusivity is decreased. However, the decrease in power generation efficiency under this low-temperature environment is not taken into consideration in the power generation control device for a fuel cell described in Patent Document 1. Accordingly, there is a risk that a significant decrease in power generation efficiency occurs in the transient state when the current is taken out of the fuel cell under the low-temperature environment.

Means for Solving the Problem

The present invention has been made in view of the aforementioned problem, and an object thereof is to limit a rate of change in a target generated current to be taken out of a fuel cell on the basis of an operating condition parameter which is correlated with an operating temperature of the fuel cell.

A power generation control device for a fuel cell according to a first aspect of the present invention comprises: a target generated power calculating unit configured to calculate target generated power of a fuel cell, based on a load condition of an electrical load device connected to the fuel cell; a target generated current calculating unit configured to calculate a target generated current to be taken out of the fuel cell, based on the target generated power; a current change rate limit value calculating unit configured to calculate a limit value for a rate of change in the target generated current, based on an operating condition parameter correlated with an operating temperature of the fuel cell; and a current limiting unit configured to limit the target generated current so that the rate of change in the target generated current does not exceed the limit value calculated by the current change rate limit value calculating unit.

A power generation control method according to a second aspect of the present invention comprises: limiting a rate of change in a target generated current to be taken out of a fuel cell, based on an operating condition parameter correlated with an operating temperature of the fuel cell.

A power generation control device for a fuel cell according to a third aspect of the present invention comprises: a target generated power calculating unit configured to calculate target generated power of a fuel cell, based on a load condition of an electrical load device connected to the fuel cell; a target generated current calculating unit configured to calculate a target generated current to be taken out of the fuel cell, based on the target generated power; and a current limiting unit configured to perform limitation to generate power in such a way that a target generated current value to be determined for a predetermined required load at a low-temperature start-up is smaller than a target generated current value to be determined for the required load at a warm-up.

A power generation control method according to a fourth aspect of the present invention comprises: calculating target generated power of a fuel cell, based on a load condition of an electrical load device connected to the fuel cell; calculating a target generated current to be taken out of the fuel cell, based on the target generated power; calculating a limit value for a rate of change in the target generated current, based on an operating condition parameter correlated with an operating temperature of the fuel cell; and limiting the target generated current so that the rate of change in the target generated current does not exceed the limit value obtained by the calculating.

A power generation control device for a fuel cell according to a fifth aspect of the present invention comprises: target generated power calculating means for calculating target generated power of a fuel cell, based on a load condition of an electrical load device connected to the fuel cell; target generated current calculating means for calculating a target generated current to be taken out of the fuel cell, based on the target generated power; a current change rate limit value calculating means for calculating a limit value for a rate of change in the target generated current based on an operating condition parameter correlated with an operating temperature of the fuel cell; and a current limiting means for limiting the target generated current so that the rate of change in the target generated current does not exceed the limit value calculated by the current change rate limit value calculating means.

Effect of the Invention

According to the present invention, a rate of change in a target generated current can be limited with consideration given to a condition of resolving water clogging caused by a rise in temperature inside a fuel cell. Hence a significant decrease in power generation efficiency in a transient state can be prevented even when the fuel cell generates power under a low-temperature environment.

MODES FOR CARRYING OUT THE INVENTION

A specific embodiment of the present invention will be described below in detail with reference to the accompanying drawings.

Figure 1:
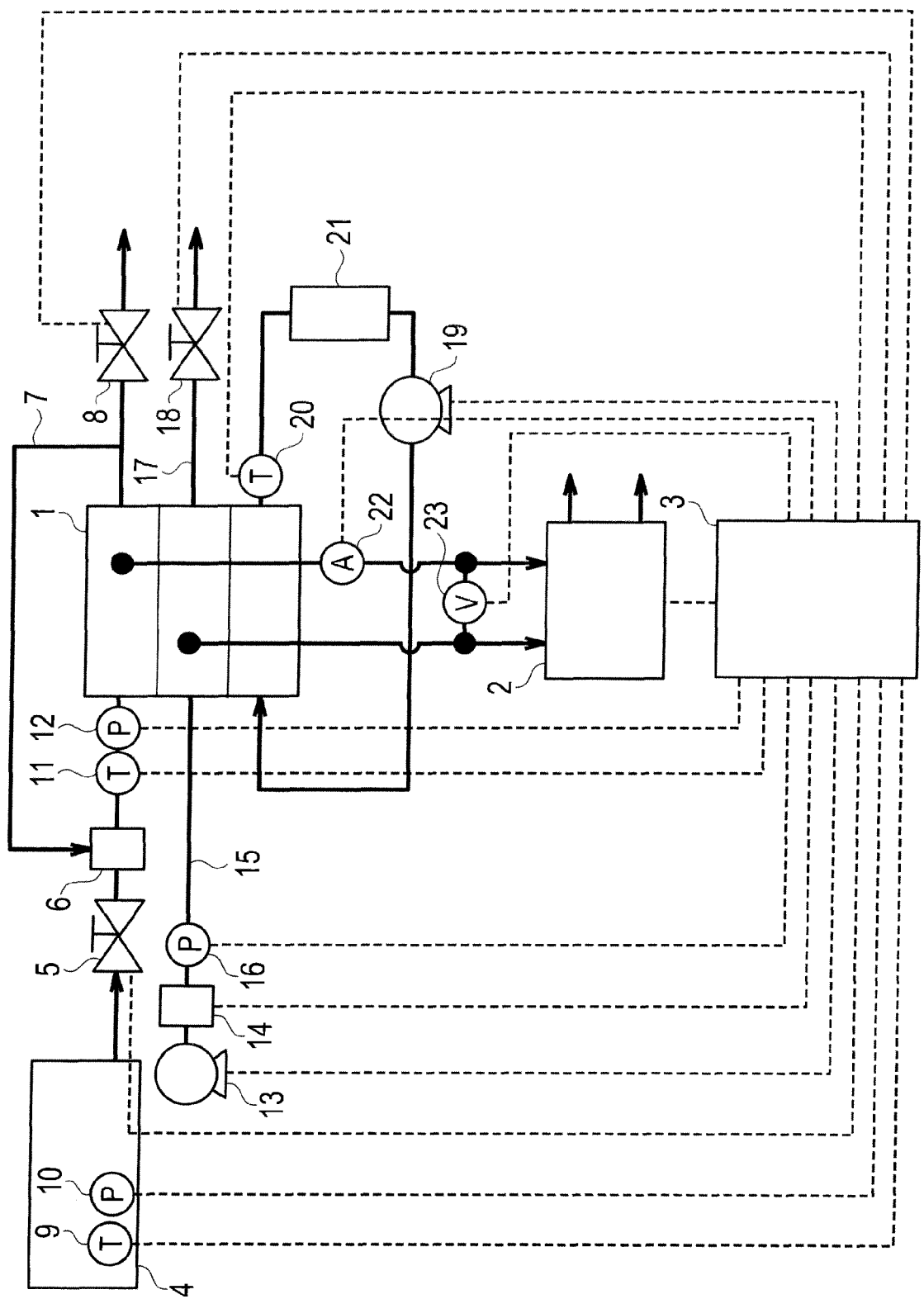
FIG. 1 is a view showing a configuration of a fuel cell system according to an embodiment of the present invention.

FIG. 1 is a view showing a configuration of a fuel cell system 100 according to this embodiment. The fuel cell system 100 is mounted as a power supply source on a hybrid electric car, for example, and is configured to supply power to electrical load devices such as a driving motor (outside the fuel cell system 100) and an auxiliary machine (inside the fuel cell system 100) of the hybrid electric car, and includes a fuel cell stack 1 configured with multiple fuel cells stacked together.

Each of the fuel cells constituting the fuel cell stack 1 includes a membrane electrode bonded body formed in such a way that a fuel electrode (an anode) receiving supply of a fuel gas and an oxidant electrode (a cathode) receiving supply of an oxidant gas are disposed to face each other with a solid polymer electrolyte membrane interposed therebetween, the membrane electrode bonded body sandwiched by a separator. The separator of each of the fuel cells constituting the fuel cell stack 1 includes a fuel gas passage on the anode side for the fuel gas to flow therethrough, and an oxidant gas passage on the cathode side for the oxidant gas to flow therethrough. Moreover, as the fuel gas containing hydrogen is supplied to the anode side of each fuel cell and the oxidant gas (air) containing oxygen is supplied to the cathode side of each fuel cell, the fuel cell stack 1 performs power generation by electrochemical reactions shown below in formula (1) and formula (2).

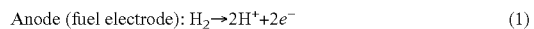

$$\text{Anode (fuel electrode): } H_2 \rightarrow 2H^+ + 2e^- \quad (1)$$

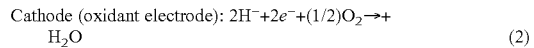

$$\text{Cathode (oxidant electrode): } 2H^+ + 2e^- + (1/2)O_2 \rightarrow + H_2O \quad (2)$$

In addition to the fuel cell stack 1 configured to perform power generation, the fuel cell system 100 according to this embodiment also includes a hydrogen supply system configured to supply the fuel gas (pure hydrogen is used as the fuel gas in the following description) to the fuel cell stack 1, an air supply system configured to supply the air serving as the oxidant gas to the fuel cell stack 1, a cooling system configured to cool down the fuel cell stack 1, a power control device 2 configured to control taking the power out of the fuel cell stack 1, and a controller 3 (a power generation control device) configured to perform overall control of operations in the fuel cell system 100.

The hydrogen supply system includes a hydrogen tank 4 configured to store hydrogen serving as the fuel gas, a hydrogen pressure control valve 5 configured to adjust a pressure of the hydrogen supplied from the hydrogen tank 4, an ejector 6 configured to mix the hydrogen supplied from the hydrogen tank 4 with recirculated hydrogen, a hydrogen circulation passage 7 configured to recirculate the hydrogen not consumed in the fuel cell stack 1, a hydrogen purge valve 8 configured to discharge an impurity not used in the reactions in the fuel cell stack 1, a tank temperature sensor 9 configured to detect a temperature inside the hydrogen tank 4, a tank pressure sensor 10 configured to detect a pressure inside the hydrogen tank 4, a hydrogen inlet temperature sensor 11 configured to detect a temperature of the hydrogen at an anode inlet of the fuel cell stack 1, and a hydrogen inlet pressure sensor 12 configured to detect a pressure of the hydrogen at the anode inlet of the fuel cell stack 1.

In this hydrogen supply system, the hydrogen is stored in the hydrogen tank 4, and the temperature and the pressure inside the hydrogen tank 4 are measured by the tank temperature sensor 9 and the pressure sensor 10, respectively. The high-pressure hydrogen taken out of the hydrogen tank 4 is subjected to pressure control by the hydrogen pressure control valve 5 and is supplied to the ejector 6, and is mixed with the hydrogen passing through the hydrogen circulation passage 7 in the ejector 6. Then, the hydrogen mixed in the ejector 6 is supplied to the anode of the fuel cell stack 1. Here, the temperature and the pressure of the hydrogen at the anode inlet of the fuel cell stack 1 are respectively detected by the hydrogen inlet temperature sensor 11 and the hydrogen inlet pressure sensor 12 and are transmitted to the controller 3. Thereafter, the control of the hydrogen pressure control valve 5 is performed by the controller 3 based on the pressure measured by the hydrogen inlet pressure sensor 12. Meanwhile, the hydrogen discharged from the fuel cell stack 1 usually flows to the hydrogen circulation passage 7 when the hydrogen purge valve 8 is closed. However, the hydrogen purge valve 8 is opened when water leakage (flooding) or the like occurs in the fuel cell stack 1 or when an operating pressure of the fuel cell stack 1 needs to be reduced, for example, so that the hydrogen existing inside the hydrogen circulation passage 7 and the fuel cell stack 1 is discharged. Here, the operating pressure of the fuel cell stack 1 is variable. Specifically, the gas pressure is set appropriately depending on an output to be taken out of the fuel cell stack 1 or on the temperature thereof.

The air supply system includes a compressor 13 configured to pressurize and deliver the air serving as the oxidant gas, an air flow rate sensor 14 configured to detect a flow rate of the air delivered from the compressor 13, an air supply passage 15 configured to supply the air delivered from the compressor 13 to the cathode of the fuel cell stack 1, an air inlet pressure sensor 16 configured to detect a pressure of the air at the cathode inlet of the fuel cell stack 1, an exhaust air passage 17 configured to discharge the air from the cathode of the fuel cell stack 1, and an air pressure control valve 18 configured to control a pressure of the air in the fuel cell stack 1.

In this air supply system, the compressor 13 takes the air from the atmosphere and then pressurizes and delivers the taken air. The air delivered from the compressor 13 is measured by the air flow rate sensor 14, then sent to the air supply passage 15, and supplied to the cathode of the fuel cell stack 1. In this respect, the air inlet pressure sensor 16 detects a pressure of the air at the cathode inlet of the fuel cell stack 1, and the controller 3 controls an aperture of the air pressure control valve 18 based on the detected pressure.

The cooling system includes a coolant circulation pump 19 configured to circulate a coolant for cooling down the fuel cell stack 1, a coolant temperature sensor 20 configured to detect a temperature of the coolant discharged from the fuel cell stack 1, and a heat exchanger 21 configured to radiate heat from the circulated coolant for cooling down.

In this cooling system, the coolant for cooling down the fuel cell stack 1 is circulated by the coolant circulation pump 19, and the temperature of the coolant warmed up by absorbing the heat from the fuel cell stack 1 is measured by the coolant temperature sensor 20 and the coolant is then sent the heat exchanger 21 and is cooled down by radiating the heat by way of the heat exchanger 21.

The power control device 2 is a buck-boost type DC/DC converter. Being disposed between the fuel cell stack 1 and the electrical load device such as the driving motor outside the system, the power control device 2 controls taking the power out of the fuel cell stack 1. In this DC/DC converter, different switching elements are operated to perform step-up conversion and step-down conversion, and a desired voltage can be outputted in accordance with a duty ratio of a control signal to be applied to the switching elements. Therefore, the switching elements are controlled to output a voltage equal to or above an input voltage at the time of step-up conversion while the switching elements are controlled to output a voltage equal to or below the input voltage at the time of step-down conversion.

Moreover, the fuel cell system 100 includes a current sensor 22 configured to detect a generated current of the fuel cell stack 1, and a voltage sensor 23 configured to detect a generated voltage of the fuel cell stack 1. Detection values of the current sensor 22 and the voltage sensor 23 are outputted to the controller 3.

The controller 3 includes a microcomputer having, for example, a central processing unit (CPU), a random access memory (RAM), a read-only memory (ROM), and an input-output interface (I/O interface), and is configured to perform overall control of operations in the fuel cell system 100 by executing predetermined control programs. Specifically, the controller 3 controls the operations of the fuel cell system 100 by receiving outputs from all the above-described sensors inside the fuel cell system 100 and outputting driving signals to actuators configured to drive the various auxiliary machines such as the compressor 13 and the hydrogen purge valve 8. Meanwhile, the controller 3 is configured to control the operations of the power control device 2 including the DC/DC converter by carrying out power generation control processing to be described later in detail, and thereby to allow actual generated power of the fuel cell stack 1 to follow target generated power accurately without occurrence of a significant decrease in power generation efficiency. That is to say, the present invention is applied to the controller 3 (the power generation control device). Meanwhile, the controller 3 may include multiple microcomputers, and may also be a device configured to execute multiple control tasks in addition to the control of the power generation control processing to be described later.

Now, a following result of the actual generated power toward the target generated power of the fuel cell stack 1 will be explained in the case where the controller 3 in the fuel cell system 100 of this embodiment thus configured carries out the power generation control processing to be described later (FIG. 3(a), FIG. 3(b)). Here, the case will be described in comparison with a case where limitation is imposed only on a maximum value of a target generated current to be taken out of the fuel cell stack 1 {FIG. 2(a), FIG. 2(b)}.

Figure 2:
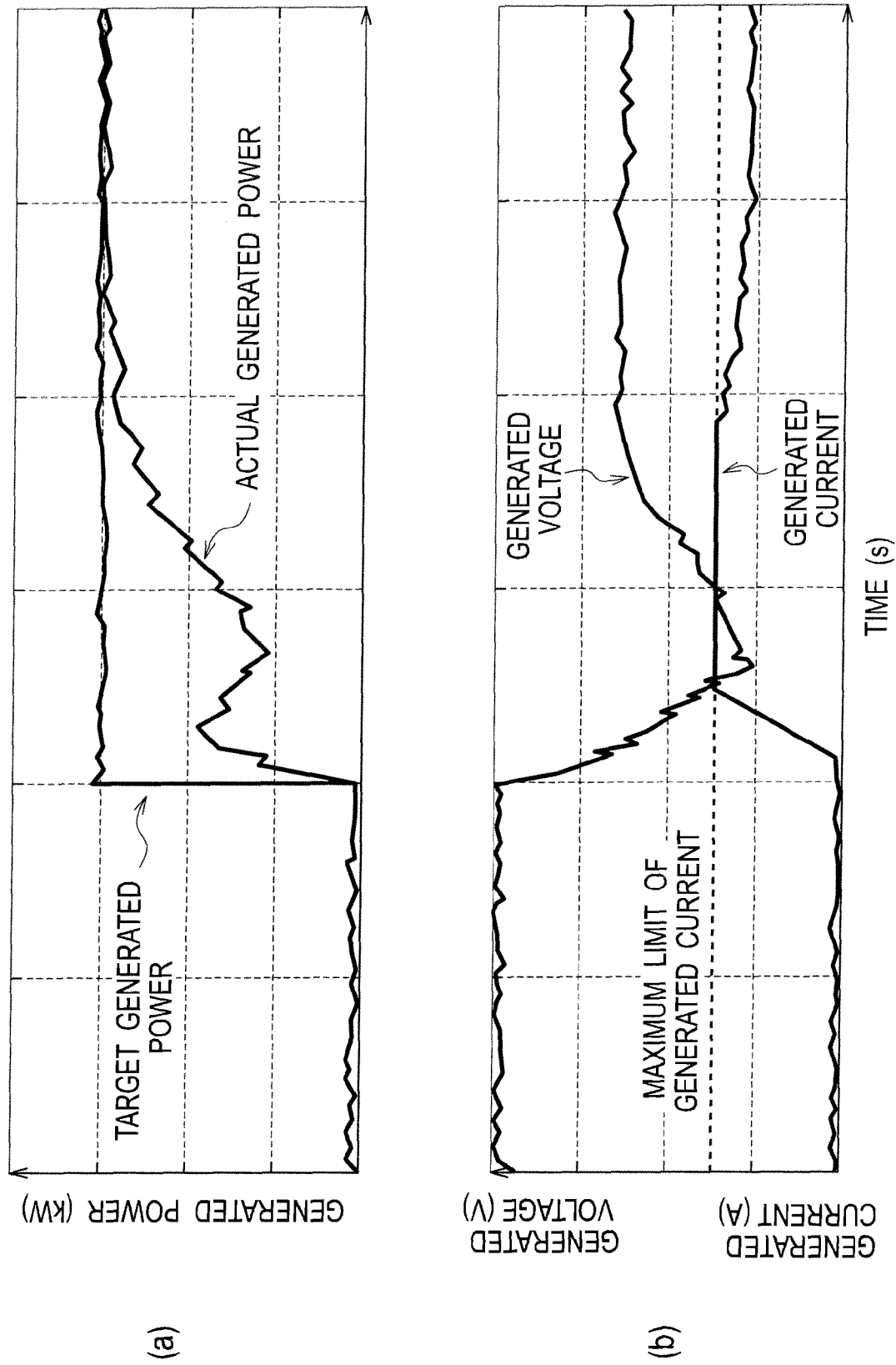
FIG. 2 is a conventional time chart showing a following result of actual generated power toward target generated power when limitation is imposed only on a maximum value of a target generated current to be taken out of a fuel cell stack.

In the case where limitation is imposed only on the maximum value of the target generated current to be taken out of the fuel cell stack 1, a generated voltage of the fuel cell stack 1 sometimes declines suddenly in a transient state as shown in FIG. 2(b) when the generated current is taken out of the fuel cell stack 1 under a low-temperature environment. Then, due to the sudden decline in the generated voltage in this transient state, the actual generated power to be taken out of the fuel cell stack 1 may differ significantly from the target generated power as shown in FIG. 2(a).

Figure 3:
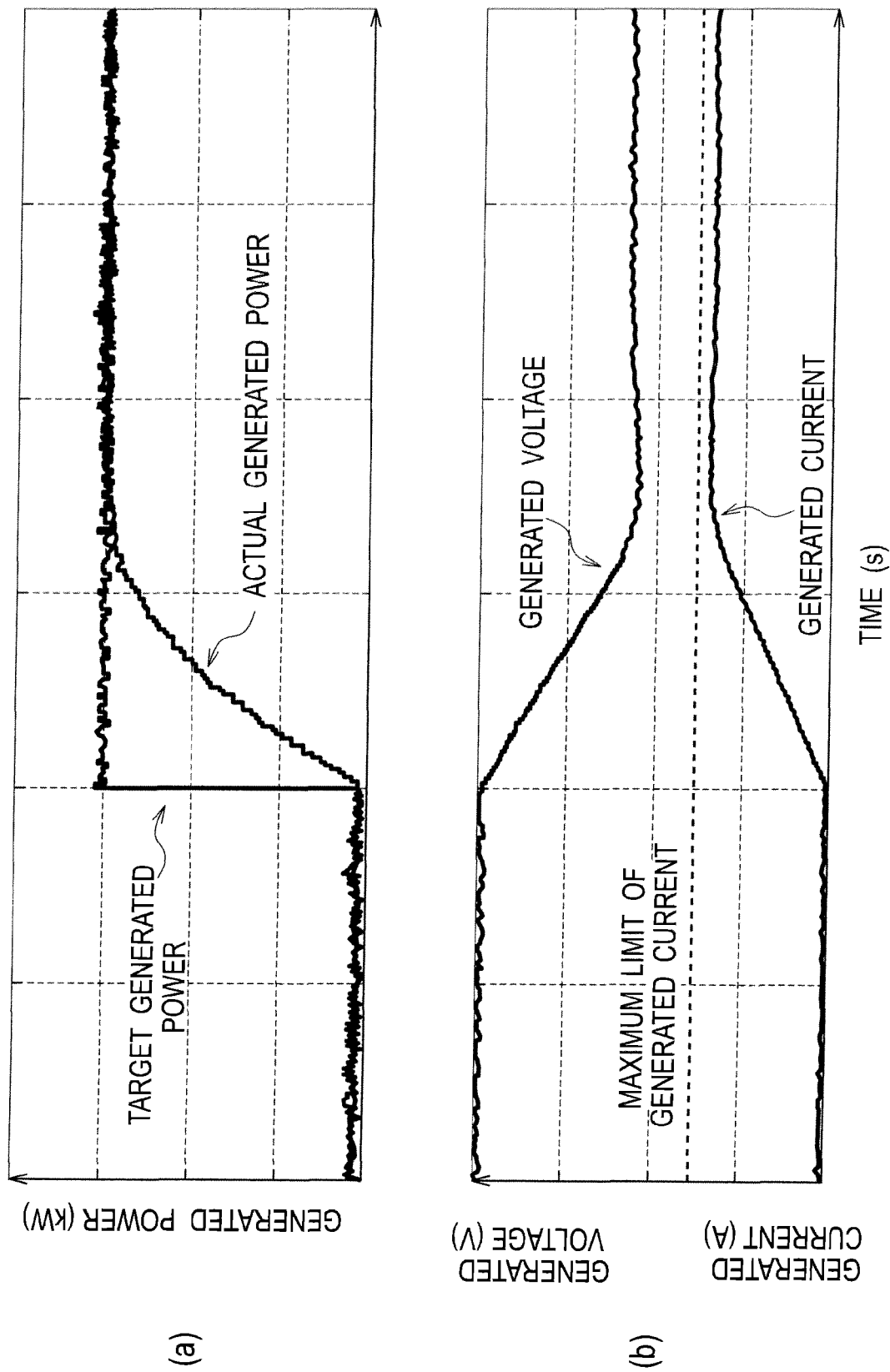
FIG. 3 is a time chart showing a following result of actual generated power toward target generated power when a controller carries out power generation control processing using the present invention.

On the other hand, in the case where the controller 3 carries out the power generation control processing to be described later, it is possible to suppress the decline in the generated voltage of the fuel cell stack 1 in the transient state as shown in FIG. 3(b) when the generated current is taken out of the fuel cell stack 1 under the low-temperature condition (including below zero temperatures). This is because a rate of change (a rate of upward change) in the target generated current to be taken out of the fuel cell stack 1 is limited with consideration given to an influence of degradation in an oxygen dispersion performance in a condition of water clogging occurring in pores of a cathode catalytic layer, and a condition of resolving the water clogging caused by a rise in temperature inside the fuel cell due to the generated current to be taken out of the fuel cell stack 1, for example. Moreover, the actual generated power can follow the target generated power while the rate of change in the target generated current is maintained in the neighborhood of a limit value. Hence, the shortest power response in accordance with an operating temperature of the fuel cell stack 1 can be achieved.

Next, the power generation control processing by the controller 3 using the present invention will be described with reference to a flowchart of FIG. 4. The series of the processing indicated in the flowchart of FIG. 4 is executed by the controller 3 at a predetermined time period (such as a 10-microsecond period).

Figure 4:
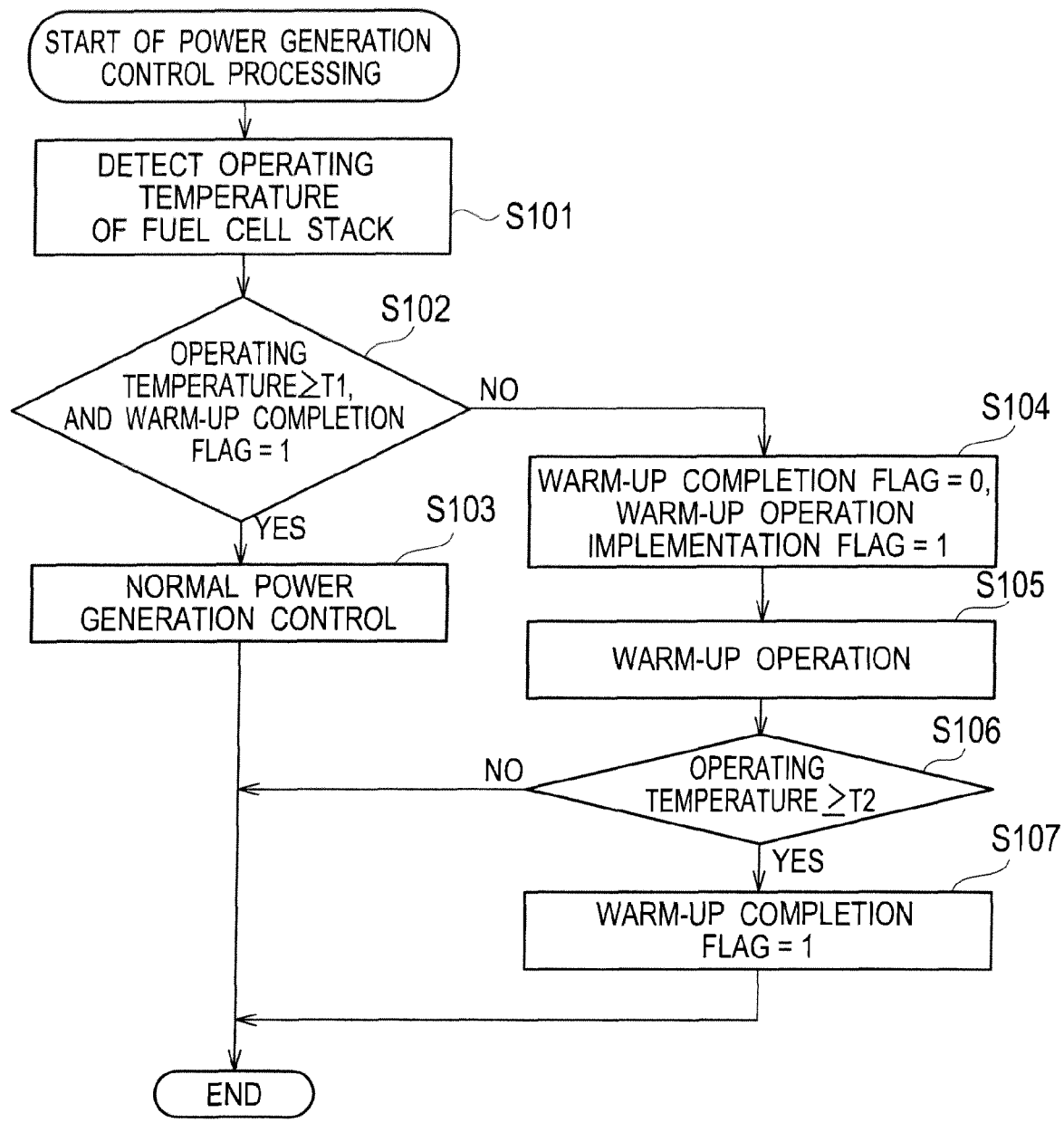
FIG. 4 is a flowchart showing a flow of the power generation control processing to be carried out by the controller.

When the flow in FIG. 4 is started, the controller 3 firstly detects the operating temperature of the fuel cell stack in step S101. Here, an operating condition parameter correlated with the operating temperature of the fuel cell stack 1, such as a temperature of the coolant absorbing the temperature of the fuel cell stack 1, is used as the operating temperature of the fuel cell stack 1. Specifically, the controller 3 inputs a temperature detection value of the coolant temperature sensor 20 and uses this temperature detection value of the coolant temperature sensor 20 as the operating temperature of the fuel cell stack 1.

Next, a judgment is made in step S102 as to whether or not the fuel cell stack 1 is in a movable state of power generation. Here, when the operating temperature of the fuel cell stack 1 detected in step S101 is equal to or above T1 and a warm-up completion flag is set to "1", a judgment is made that the fuel cell stack 1 is in the movable state of power generation and the processing goes to step S103. On the other hand, if the above-mentioned condition is not satisfied, a judgment is made that the fuel cell stack 1 is not in the movable state of power generation and the processing goes to step S104. Note that the warm-up completion flag is a flag indicating that processing in step S105 to be described later does not need to be carried out. Meanwhile, the temperature threshold T1 is set to a temperature at which the fuel cell stack 1 may be frozen with consideration given to a location error between the fuel cell stack 1 and the coolant temperature sensor 20 used in step S101, for example.

Normal power generation control representing the power generation control in the movable state is carried out in step S103. Specific contents of this normal power generation control will be described later in detail.

Meanwhile, in step S104, the warm-up completion flag is set to "0" and a warm-up operation implementation flag is set to "1" in order to judge implementation of the warm-up operation.

Next, the warm-up operation for setting the fuel cell stack 1 to the movable state of power generation is carried out in step S105. Here, the warm-up operation is the operation to raise the temperature of the fuel cell stack 1 using self-heating caused by the power generation of the fuel cell stack 1, for example, Next, a judgment is made in step S106 as to whether or not to terminate the warm-up operation. Here, a judgment is made that the fuel cell stack 1 is set to the movable state of power generation if the operating temperature of the fuel cell stack 1 detected in step S101 is equal to or above T2, for example, and the warm-up operation is terminated. Then, in the next step S107, the warm-up completion flag is set to "1" and the power generation control processing is terminated. On the other hand, if the operating temperature of the fuel cell stack 1 detected in step S101 is below T2, the warm-up operation is continued and the power generation control processing is terminated. Here, the temperature threshold T2 is set to a temperature at which a judgment can be made that the fuel cell stack 1 is in the movable state of power generation, or is set to a temperature at which the fuel cell stack 1 does not need the warm-up operation again later, with consideration given to the location error between the fuel cell stack 1 and the coolant temperature sensor 20 used in step S101 as well as a change in the state of power generation due to the clogging of the generated water in the membrane during the warm-up operation.

Next, the normal power generation control in step S103 in the flowchart of FIG. 4 will be described further in detail.

Figure 5:
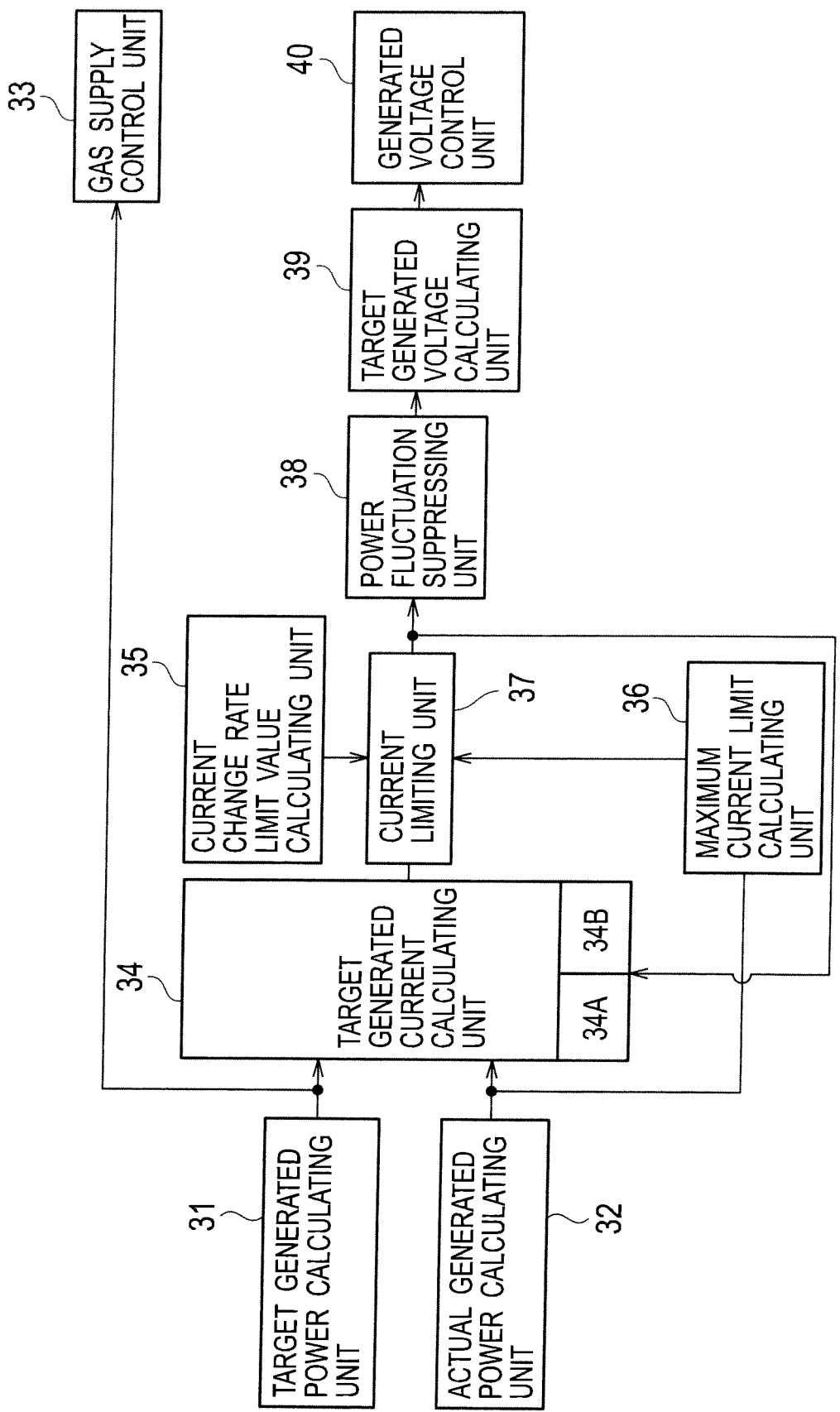
FIG. 5 is a block diagram showing a functional configuration of the controller for realizing normal power generation control which is power generation control in a movable condition.

FIG. 5 is a block diagram showing a functional configuration of the controller 3 for realizing normal power generation control. This normal power generation control is the control to be performed based on a load condition of the electrical load device connected to the fuel cell stack 1. In the following, an example of the normal power generation control will be described with the case in mind where the fuel cell system is mounted on a hybrid electric car, for example.

As a functional configuration for realizing the normal power generation, the controller 3 includes a target generated power calculating unit 31, an actual generated power calculating unit 32, a gas supply control unit 33, a target generated current calculating unit 34, a current change rate limit value calculating unit 35, a maximum current limit calculating unit 36 (a current upper limit value calculating unit), a current limiting unit 37, a power fluctuation suppressing unit 38, a target generated voltage calculating unit 39, and a generated voltage control unit 40 as shown in FIG. 5.

The target generated power calculating unit 31 calculates the target generated power of the fuel cell stack 1, based on a load parameter and the like of the driving motor which is driven upon request by a driver.

The actual generated power calculating unit 32 calculates the actual generated power to be taken out of the fuel cell stack 1 by the power control device 2, based on a current detection value by the current sensor 22 and a voltage detection value by the voltage sensor 23.

The gas supply control unit 33 performs supply control of the hydrogen and the air to the fuel cell stack 1, based on the target generated power calculated by the target generated power calculating unit 31.

In order for the actual generated power to follow the target generated power accurately, the target generated current calculating unit 34 calculates the target generated current, which is the target value of the current to be taken out of the fuel cell stack 1 by the power control device 2, based on the target generated power calculated by the target generated power calculating unit 31, the actual generated power calculated by the actual generated power calculating unit 32, and an output from the current limiting unit 37.

The current change rate limit value calculating unit 35 calculates a limit value for a rate of upward change in the target generated current and a limit value for a rate of downward change in the target generated current as limit values for the rate of change in the target generated current.

The maximum current limit calculating unit 36 calculates an upper limit value for the target generated current (a maximum current limit).

Based on the limit values for the rate of current change calculated by the current change rate limit value calculating unit 35 and the maximum current limit calculated by the maximum current limit calculating unit 36, the current limiting unit 37 limits the target generated current calculated by the target generated current calculating unit 34, and outputs the target generated current after the limitation.

The power fluctuation suppressing unit 38 subjects the target generated current after the limitation, which is the output from the current limiting unit 37, to low-pass filter processing so that a fluctuation of the actual generated power does not increase due to an instantaneous fluctuation in an IV characteristic (a current-voltage characteristic) influenced by the clogging of the generated water in the membrane of the fuel cell stack 1 and the like.

The target generated voltage calculating unit 39 converts the target generated current which has been subjected to the low-pass filter processing by the power fluctuation suppressing unit 38, into a target generated voltage to be controlled by the power control device 2.

The generated voltage control unit 40 controls the operations of the power control device 2, based on the target generated voltage calculated by the target generated voltage calculating unit 39.

Figure 6:
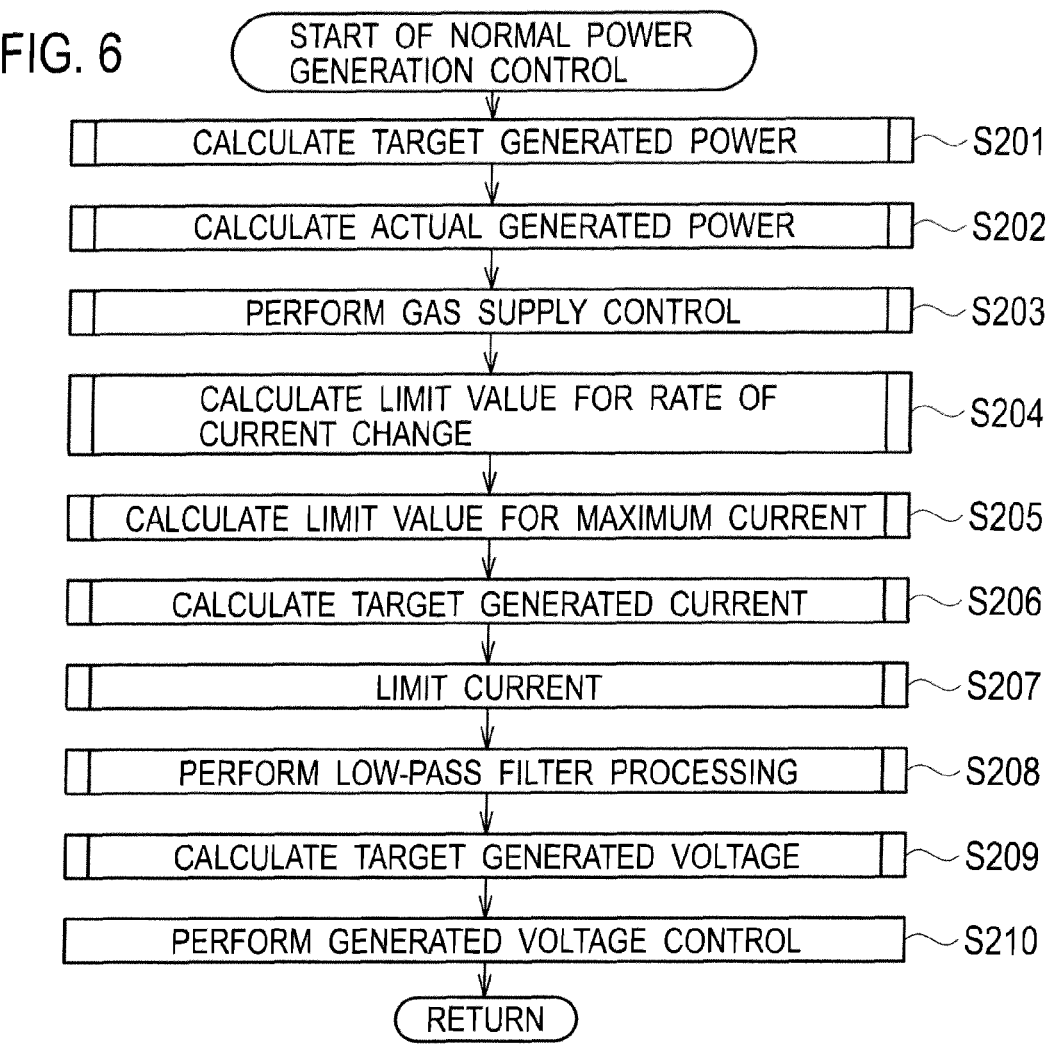
FIG. 6 is a flowchart showing an outline of the normal power generation control.

The controller 3 configured as described above carries out the normal power generation control in accordance with procedures shown in a flowchart of FIG. 6, for example.

Specifically, the target generated power of the fuel cell stack 1 is calculated firstly by the target generated power calculating unit 31 in step S201.

Next, the actual generated power of the fuel cell stack 1 is calculated by the actual generated power calculating unit 32 in step S202.

Then, in step S203, the supply control of the hydrogen and the air to the fuel cell stack 1 is carried out by the gas supply control unit 33, based on the target generated power calculated in step S201.

Subsequently, a limit value for a rate of upward change in the target generated current and a limit value for a rate of downward change in the target generated current are calculated by the current change rate limit value calculating unit 35 in step S204.

Thereafter, in step S205, an upper limit value for the target generated current (a maximum current limit) is calculated by the maximum current limit calculating unit 36, based on the actual generated power calculated in step S202.

After that, the target generated current of the fuel cell stack 1 is calculated by the target generated current calculating unit 34 in step S206.

Next, in step S207, the target generated current calculated in step S206 is limited by the current limiting unit 37, based on the limit value for the rate of upward change and the limit value for the rate of downward change in the target generated current calculated in step S204 as well as based on the upper limit value for the target generated current (the maximum current limit) calculated in step S205.

Then, in step S208, the target generated current after the limitation in step S207 is subjected to the low-pass filter processing by the power fluctuation suppressing unit 38.

Subsequently, in step S209, the target generated current which has been subjected to the low-pass filter processing in step S208 is converted into the target generated voltage by the target generated voltage calculating unit 39.

Thereafter, in step S210, the generated voltage control unit 40 controls the operations of the power control device 2 so that the target generated voltage obtained in step S209 is realized, and thereby the processing of the normal power generation control is terminated.

Figure 7:
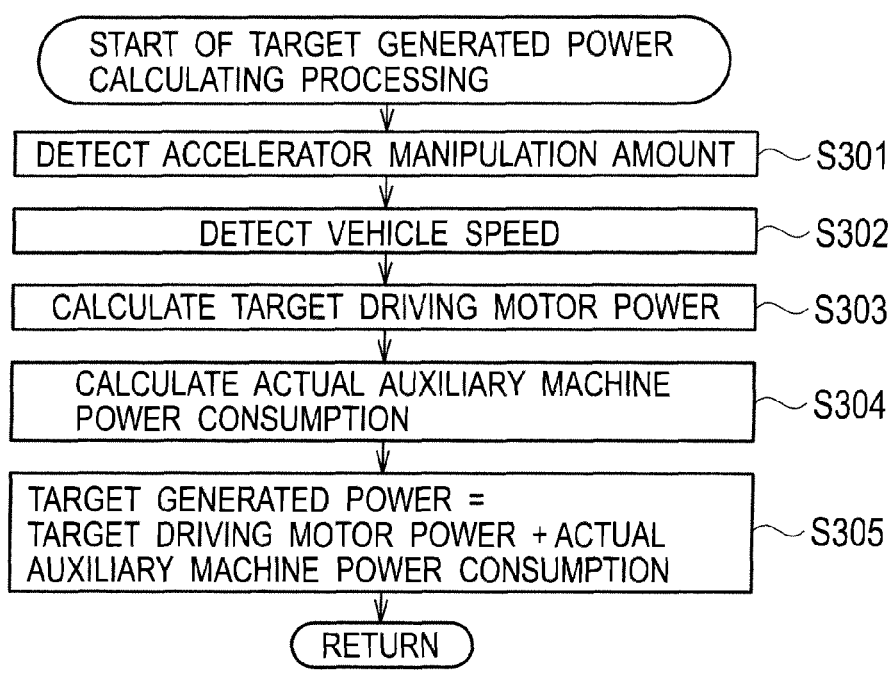
FIG. 7 is a flowchart showing details of target generated power calculation processing in step S201 of FIG. 6.

FIG. 7 is a flowchart showing details of processing by the target generated power calculating unit 31 in step S201 of FIG. 6.

The target generated voltage calculating unit 31 firstly detects an accelerator manipulation amount by a driver based on an output from an accelerator sensor installed in a vehicle in step S301, and detects a vehicle speed based on an output of a car speed sensor installed in the vehicle in step S302.

Figure 8:
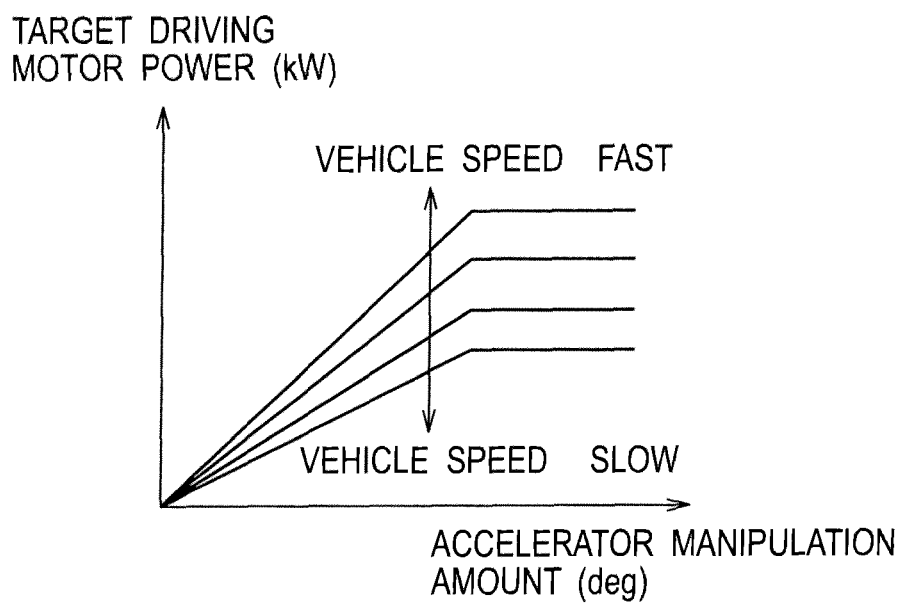
FIG. 8 is a view showing map data for calculating required generated power based on an accelerator manipulation amount and a car speed.

Next, in step S303, a power target value (target driving motor power) to be supplied to the driving motor is calculated by use of map data shown in FIG. 8, based on the accelerator manipulation amount detected in step S301 and the vehicle speed detected in step S302.

Then, power which is actually consumed by the auxiliary machines inside the fuel cell system 100 (actual auxiliary machine power consumption) is calculated in step S304. This actual auxiliary machine power consumption is calculated by detecting voltages and currents of the auxiliary machines for achieving power generation of the fuel cell stack 1, detecting auxiliary power consumption calculated by multiplying these values, detecting the numbers of revolutions and torques in the cases of the coolant pump 19, the compressor 13 and the like, obtaining calculated values by multiplying these values, and then adding power losses to these values. This power loss is estimated by inputting the number of revolutions and the torque to loss map data.

Subsequently, in step S305, the target generated power which is the target value of the power to be generated by the fuel cell stack 1 is calculated by adding the target driving motor power calculated in step S303 to the actual auxiliary machine power consumption calculated in step S304. Hence the processing by the target generated power calculating unit 31 is completed.

Figure 9:
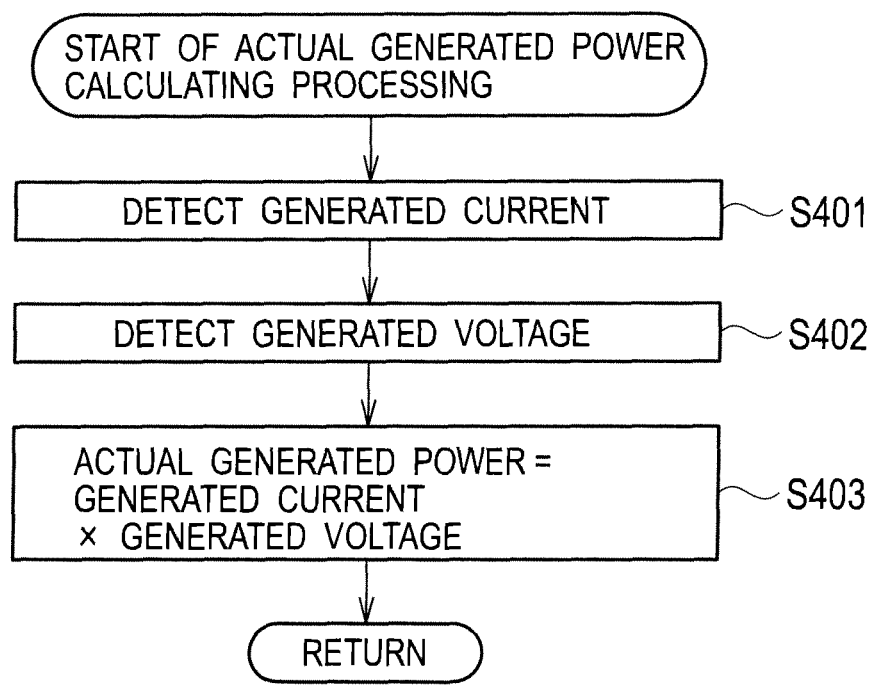
FIG. 9 is a flowchart showing details of actual generated power calculation processing in step S202 of FIG. 6.

FIG. 9 is a flowchart showing details of processing by the actual generated power calculating unit 32 in step S202 of FIG. 6.

The actual generated power calculating unit 32 firstly detects a generated current of the fuel cell stack 1 based on an output from the current sensor 22 in step S401, and detects a generated voltage of the fuel cell stack 1 based on an output from the voltage sensor 23 in step S402.

Next, in step S403, the actual generated power of the fuel cell stack 1 is calculated by multiplying the generated current of the fuel cell stack 1 detected in step S401 by the generated voltage of the fuel cell stack 1 detected in step S402. Hence the processing by the actual generated power calculating unit 32 is completed.

Figure 10:
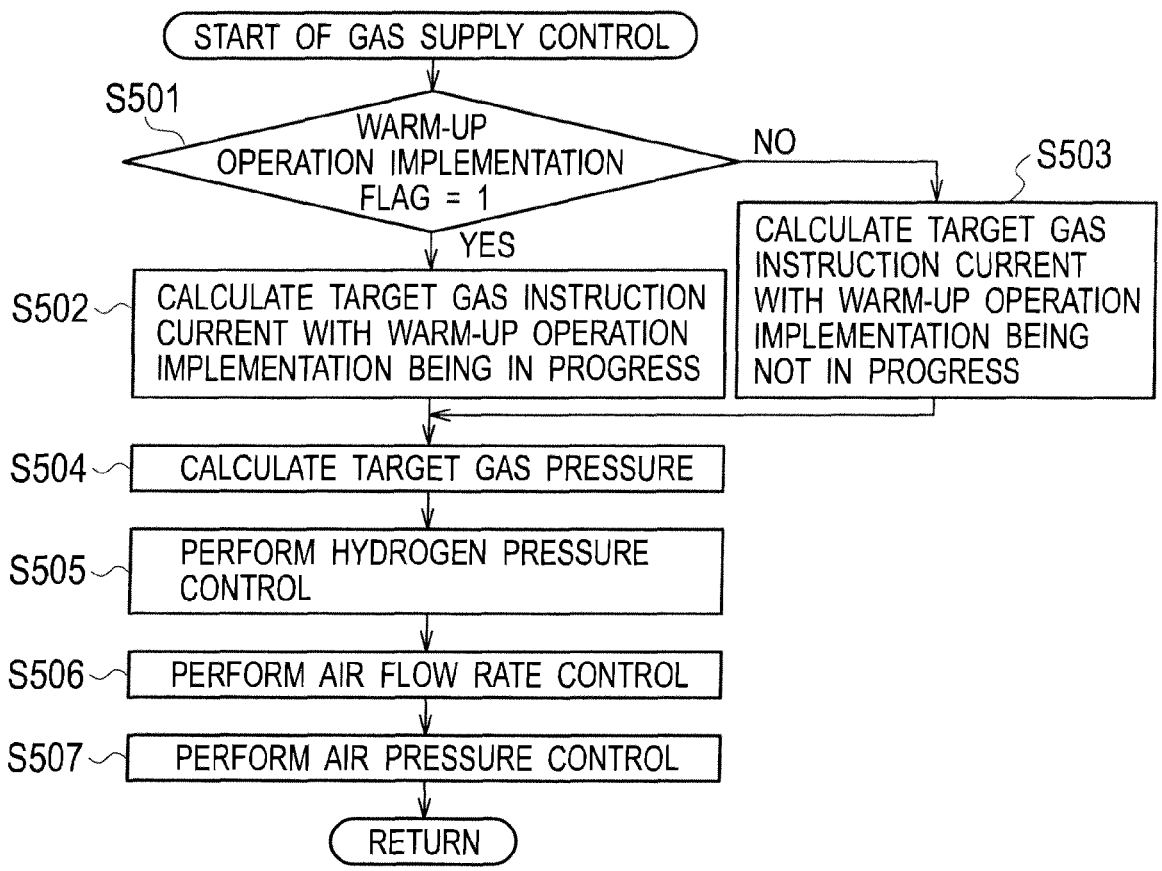
FIG. 10 is a flowchart showing details of gas supply control in step S203 of FIG. 6.

FIG. 10 is a flowchart showing details of processing by the gas supply control unit 33 in step S203 of FIG. 6.

Figure 11:
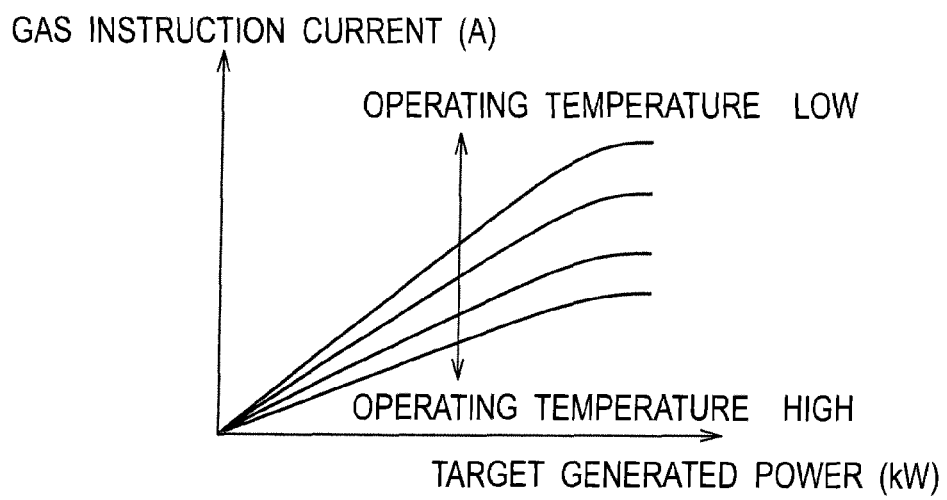
FIG. 11 is a view showing map data for calculating a gas instruction current based on target generated power and an operating temperature of the fuel cell stack.

First, in step S501, the gas supply control unit 33 judges whether or not the warm-up operation is in progress based on whether or not the warm-up operation implementation flag is set to "1". Then, if the warm-up operation implementation flag is set to "1", i.e., if the warm-up operation is in progress, then gas instruction currents for determining gas pressures and gas flow rates are calculated in step S502 by use of map data as shown in FIG. 11, for example. The map data used herein are designed so that the gas instruction current does not fall below the generated current to be taken out of the power control device 2 by grasping, using experimental data and the like, temperature sensitivity of the IV characteristic and degradation in the IV characteristic in a steady state due to the influence of the clogging of the generated water in the membrane caused by the fuel cell stack 1 during the warm-up operation.

Meanwhile, if the warm-up operation implementation flag is set to "0", if the warm-up operation is not in progress, then the gas instruction currents are calculated by use of map data in step S503 in a similar manner to step S502. The map data used herein are designed based on measurement values from experiments and the like without containing a margin of degradation in the IV characteristic in the steady state due to the influence of the clogging of the generated water in the membrane caused by the fuel cell stack 1 during the warm-up operation.

Figure 12:
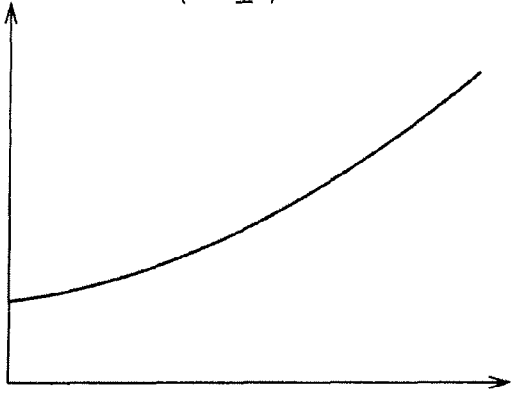
FIG. 12 is a view showing table data for calculating a target gas pressure based on the gas instruction current.

Next, a target gas pressure is calculated in step S504. This target gas pressure is calculated by use of table data shown in FIG. 12 based on the gas instruction current calculated either in step S502 or in step S503. The table data are set up in consideration of power generation efficiency of the fuel cell stack 1, for example.

Then, pressure control of the hydrogen is performed in step S505. This pressure control of the hydrogen is configured to control the hydrogen pressure at the anode by operating the hydrogen pressure control valve 5 based on the target gas pressure calculated in step S504. In this respect, the operation of the hydrogen pressure control valve 5 is executed by determining an instructed aperture of the hydrogen control valve 5 by feedback control based on a deviation between the target gas pressure and the hydrogen pressure of the fuel cell stack 1 detected by the hydrogen inlet pressure sensor 12. Note that this feedback control may also be structured by other well-known methods including PI control, model reference adaptive control, and the like. Meanwhile, the instructed aperture of the hydrogen pressure control valve 5 calculated herein is issued from the controller 3 to a driving circuit of the hydrogen pressure control valve 5, whereby the hydrogen pressure control valve 5 is driven in accordance with the instructed aperture.

Figure 13:
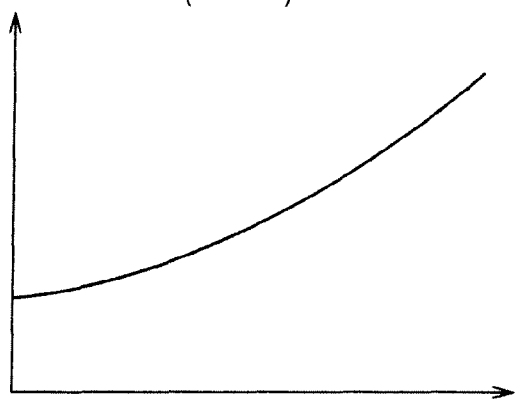
FIG. 13 is a view showing table data for calculating a target air flow rate based on the gas instruction current.
Figure 14:
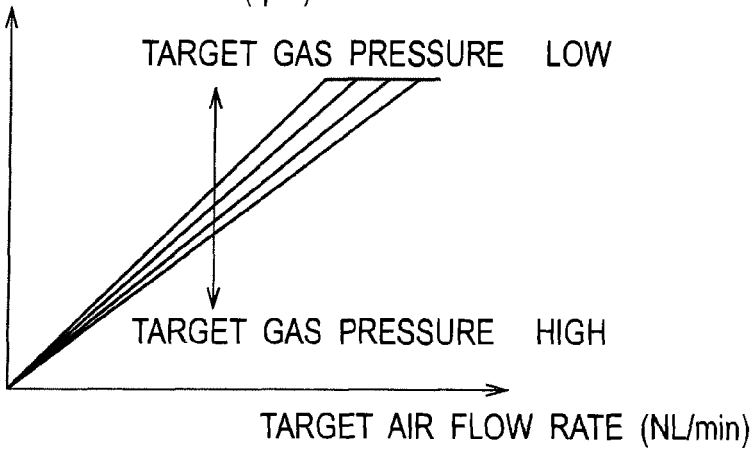
FIG. 14 is a view showing map data for calculating compressor instruction revolutions based on the target air flow rate and the target gas pressure.

Subsequently, the air flow rate control is performed in step S506. This air flow rate control is executed as described below, for example. First, a target air flow rate is calculated by use of table data shown in FIG. 13 based on the gas instruction current calculated either in step S502 or in step S503. The table data are set up to achieve an air utilization ratio so that a local air supply shortage does not occur inside the fuel cell stack 1. Then, after the target air flow rate is calculated, an instructed number of compressor revolutions is calculated by use of map data shown in FIG. 14 based on the target air flow rate and the target gas pressure. Note that the map data are designed based on characteristics of the air flow rate for the number of revolutions and a pressure ratio of the compressor 13. Meanwhile, the instructed number of compressor revolutions calculated herein is issued from the controller 3 to a driving circuit of the compressor, whereby the compressor 13 is driven in accordance with the instructed number of revolutions.

Thereafter, air pressure control is performed in step S507. This air pressure control is configured to control the air pressure by operating the air pressure control valve 18 based on the target gas pressure calculated in step S504. The operation of the air pressure control valve 18 is executed by determining an instructed aperture of the air pressure control valve 18 by feedback control based on a deviation between the target gas pressure and the air pressure of the fuel cell stack 1 detected by the air inlet pressure sensor 16. Note that this feedback control may also be structured by well-known methods such as PI control and model reference adaptive control. Meanwhile, the instructed aperture of the air pressure control valve 18 calculated herein is issued from the controller 3 to a driving circuit of the air pressure control valve 18, whereby the air pressure control valve 18 is driven in accordance with the instructed aperture. Hence the processing by the gas supply control unit 33 is completed.

Figure 15:
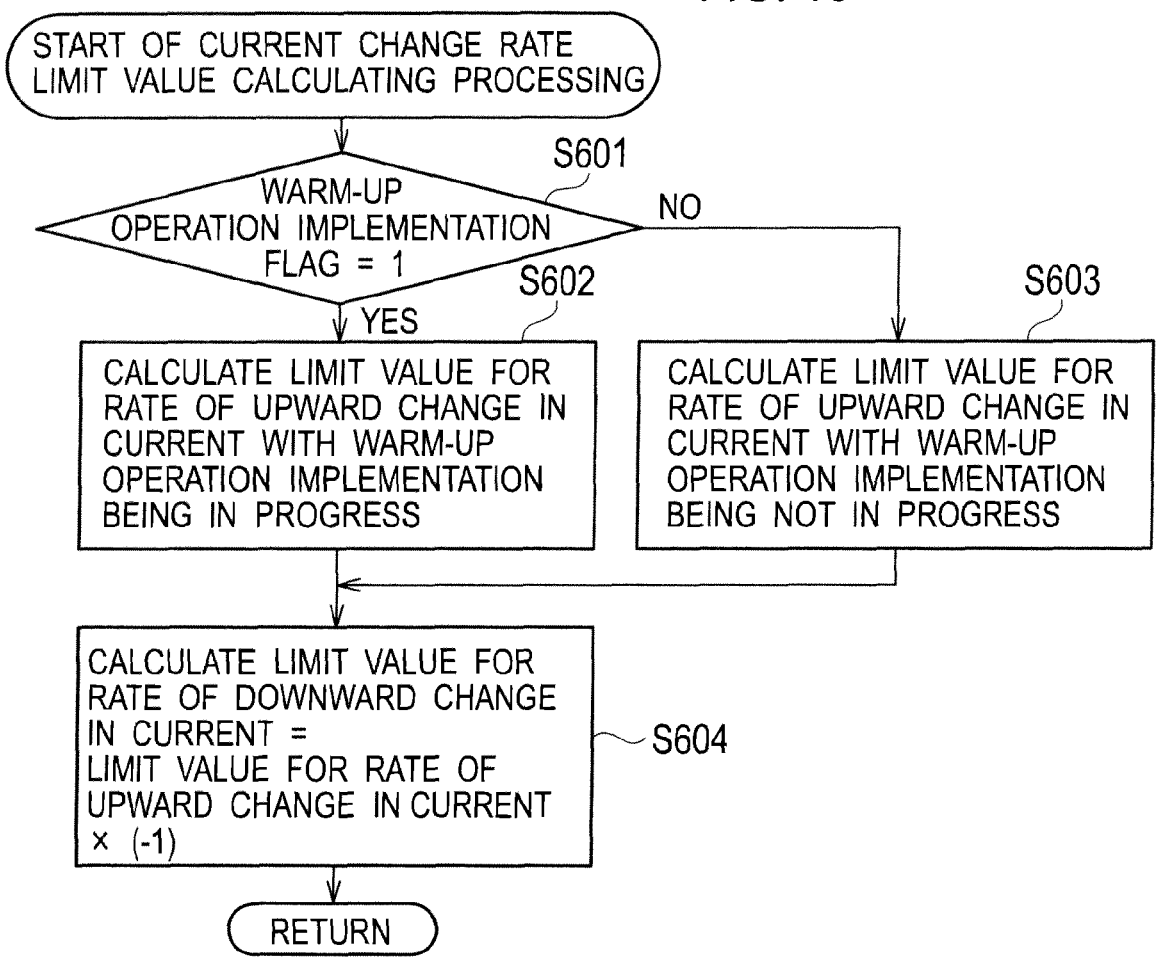
FIG. 15 is a flowchart showing details of current change rate limit value calculating processing in step S204 of FIG. 6.

FIG. 15 is a flowchart showing details of processing by the current change rate limit value calculating unit 35 in step S204 of FIG. 6.

Figure 16:
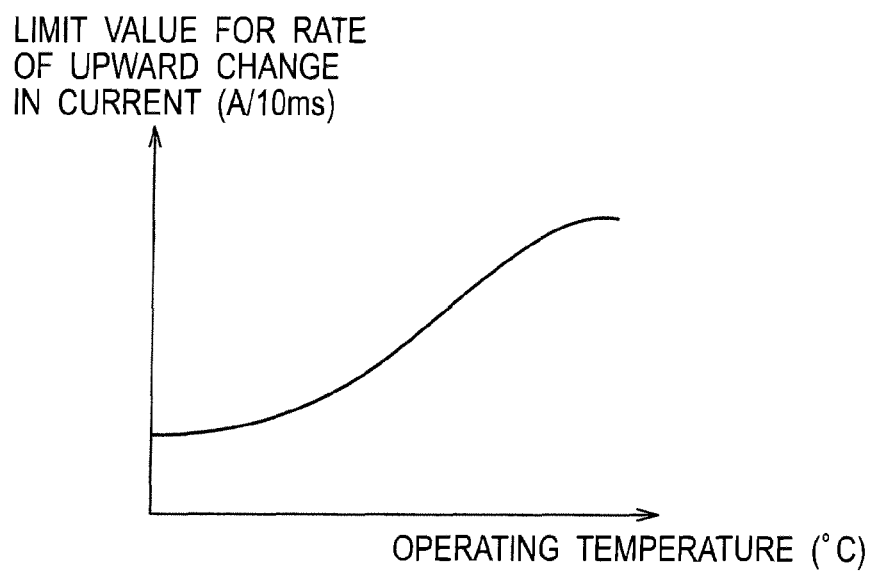
FIG. 16 is a view showing table data for calculating a limit value for an upward change in a current change rate based on the operating temperature of the fuel cell stack.

First, in step S601, the current change rate limit value calculating unit 35 judges whether or not the warm-up operation is in progress based on whether or not the warm-up operation implementation flag is set to "1". Next, if the warm-up operation implementation flag is set to "1", i.e., if the warm-up operation is in progress, then the limit value for the rate of upward change in the target generated current to be taken out of the fuel cell stack 1 after the warm-up operation implementation is calculated in step S602. Here, the limit value for the rate of upward change in the target generated current is calculated by use of table data in FIG. 16 based on the operating temperature of the fuel cell stack 1 detected in step S101 of FIG. 4. That is, along the increase in the operating temperature of the fuel cell stack 1, a higher value is calculated as the limit value for the rate of upward change in the target generated current. Specifically, a limit value for a rate of rise is relaxed. The table data are designed from a viewpoint of preventing significant decrease in power generation efficiency in the transient state after the warm-up operation. To be more precise, for example, an amount of water clogging occurring in a cathode catalytic layer during the warm-up operation and a situation of resolving the water clogging at the time of a rise in temperature inside the fuel cell stack 1 for the rate of change in the generated current to be taken out of the fuel cell stack 1 by the power control device 2 are set up based on desktop design. Alternatively, it is also possible to use map data prepared by adding the target generated current taken out of the power control device 2 during the warm-up operation or an integrated value of the actual generated current, for example, instead of the operating temperature of the fuel cell stack 1.

On the other hand, if the warm-up operation implementation flag is set to "0", i.e., if the warm-up operation is not carried out, then a fixed value is set as the limit value for the rate of upward change in the target generated current for non warm-up operation implementation. This fixed value is set up so that the actual generated power does not differ significantly from the target generated power in light of a transient response required for driving motor power and the like.

Next, the limit value for the rate of downward change in the target generated current calculated in step S604. Here, the limited value is also set for the rate of downward change in the target generated current in such a way that a steady-state deviation between the actual generated power and the target generated power does not occur, i.e., the difference between the target generated power and the actual generated power is not equal to or above a predetermined value even if the target generated power obtained in step S201 of FIG. 6 varies due to measurement fluctuation of the load parameter used for the calculation and the like. This limit value for the rate of downward change is set to a value obtained by multiplying the limit value for the rate of upward change calculated either in step S602 or in step S603 by −1, for example. Meanwhile, it is also possible to set up the value in such a way that the steady-state deviation between the target generated power and the actual generated power is not equal to or above the predetermined value after a relation between the IV characteristic of the fuel cell stack 1 and the limit for the rate of the upward change in the target generated current is investigated based on experimental data. Hence the processing by the current change rate limit value calculating unit 35 is completed.

Figure 17:
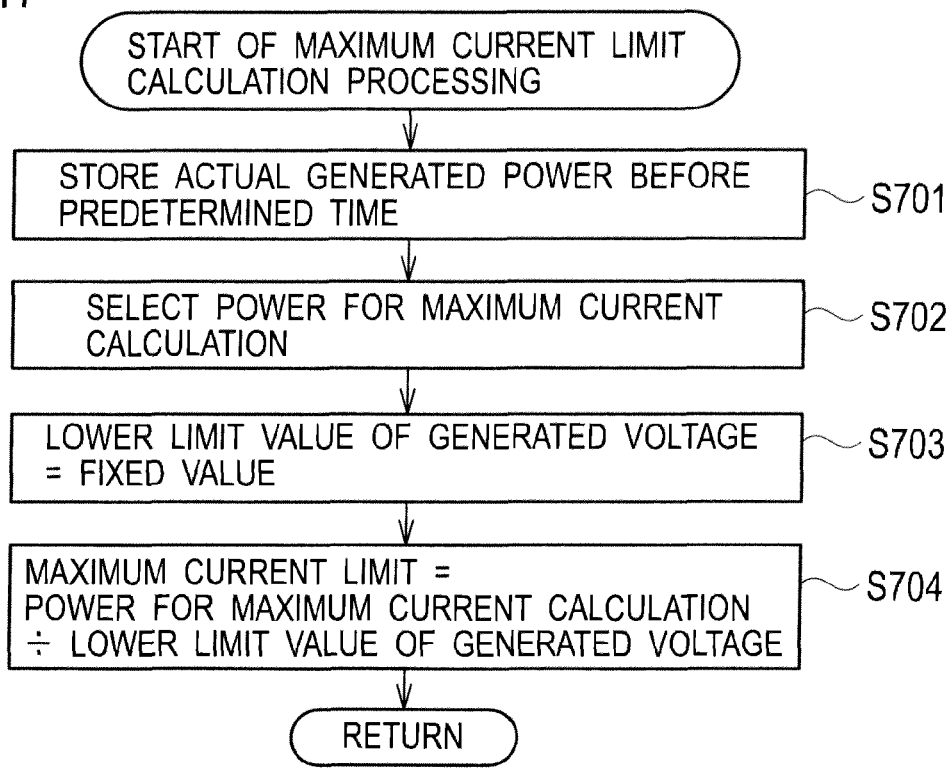
FIG. 17 is a flowchart showing details of maximum current limit calculation processing in step S205 of FIG. 6.

FIG. 17 is a flowchart showing details of processing by the maximum current limit calculating unit 36 in step S205 of FIG. 6. As will be described later in detail, this processing by the maximum current limit calculating unit 36 is intended to limit the maximum value of the target generated current in conformity to limitation of the target generated power so that the generated voltage of the fuel cell stack 1 does not fall below a predetermined lower limit value.

First, in step S701, the maximum current limit calculating unit 36 stores all the values of the actual generated power (the actual generated power calculated in step S202 of FIG. 6)

before predetermined time. Here, the predetermined time is set to time including one period or more of a fluctuation element having the slowest period with consideration given to measurement fluctuations in the steady state of the current sensor 22 and the voltage sensor 23 used for the calculation of the actual generated power as well as disturbance fluctuation, for example.

Next, in step S702, the actual generated power (power for maximum current calculation) used for calculating the upper limit value of the target generated current (the maximum current limit) is selected from the values of the actual generated power before the predetermined time stored in step S701. Here, the maximum value out of the stored actual generated power is selected as the power for maximum current calculation, from a viewpoint of suppressing limitation of the maximum current of the target generated current beyond necessity in a scene where the lower limit value of the target generated voltage is not limited by the generated voltage control unit 40.

Next, in step S703, a fixed value is set as the lower limit of the generated voltage. The fixed value herein is set to a lower limit voltage from a viewpoint of preventing deterioration by prevention of polarity inversion of a cell voltage in the fuel cell stack 1 and of preventing an operation defect due to a drop in a power source voltage of the electrical load device such as the driving motor connected to the fuel cell stack 1. Alternatively, it is also possible to set the lower limit value of the generated voltage variably depending on the operating temperature of the fuel cell stack 1 or the state of implementation of the warm-up operation, for example. The lower limit value of the generated voltage can be set to a lower level, by setting the variable value, in the case of a high IV characteristic of the fuel cell stack 1. Thus, the maximum value of the generated power can be increased.

Next, in step S704, the upper limit value of the target generated current (the maximum current limit) to be taken out of the fuel cell stack 1 is calculated by dividing the power for maximum current calculation selected in step S702 by the lower limit value of the generated voltage obtained in S703. Here, the calculation of the upper limit value of the target generated current (the maximum current limit) in the step S704 may be validated or invalidated depending on the relation between the target generated voltage to be calculated in step S209 of FIG. 6 and the actual generated voltage detected by use of the voltage sensor 23. In this case, by invalidating the calculation in the scene where the maximum value of the target generated current does not have to be limited due to the relation between the target generated voltage and the actual generated voltage, it is possible to prevent limitation of the target generated current beyond necessity owing to a calculation delay generated by a communication delay between the controller 3 and the power control device 2, and so forth. Hence the processing by the maximum current limit calculating unit 36 is completed.

Figure 18:
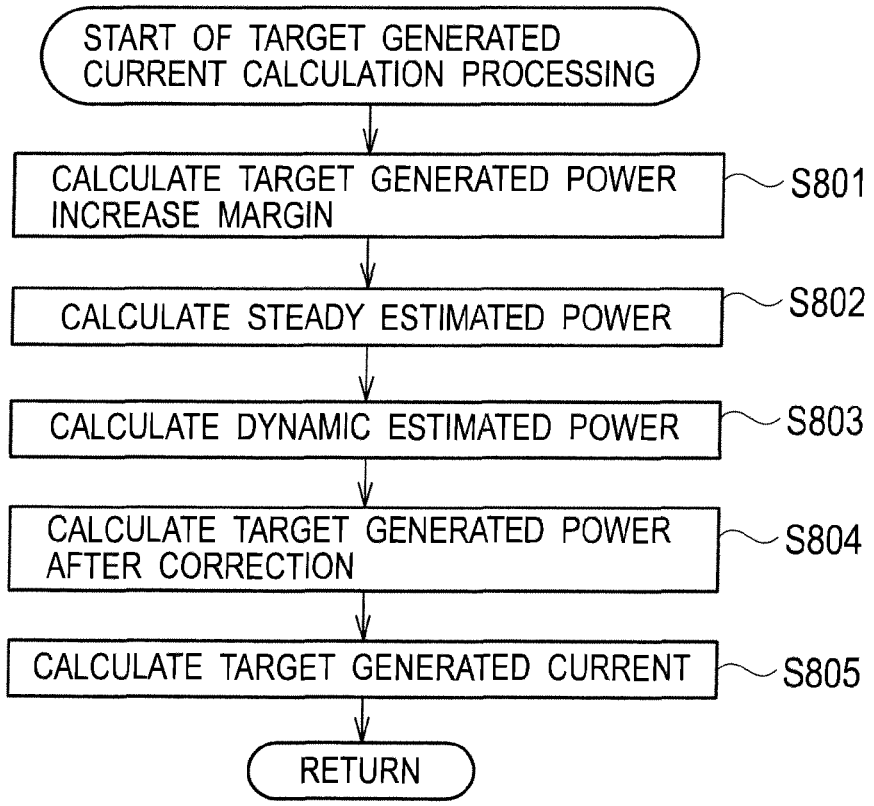
FIG. 18 is a flowchart showing details of target generated current calculation processing in step S206 of FIG. 6.

FIG. 18 is a flowchart showing details of processing by the target generated current calculating unit 34 in step S206 of FIG. 6.

Figure 19:
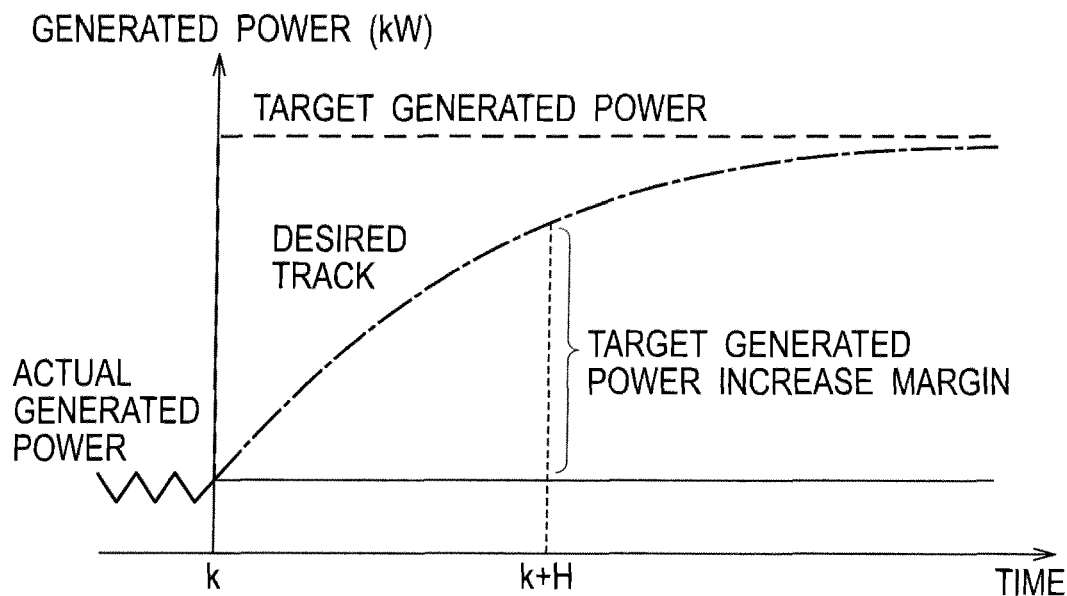
FIG. 19 is a view to explain an example of a calculation method for a target generated power increase margin.

First, in step S801, the target generate current calculating unit 34 calculates a target generated power increase margin to determine how much the actual generated power is to be increased for the target generated power after predetermined time by a target generated power increase margin 34A so that the actual generated power calculated in step S202 conforms to the target generated power calculated in step S201 of FIG. 6. Here, a calculation method for the target generated power increase margin in the case of regarding a dynamic characteristic of the driving motor, which is the electrical load device connected to the fuel cell stack 1, as a primary delay characteristic of a time constant A will be described by using FIG. 19.

Since the dynamic characteristic of the driving motor can be regarded as the primary delay characteristic, the target generated power increase margin after predetermined time [k+H] can be calculated in accordance with the following formula (3) based on the deviation between the target generated power and the actual generated power.

Target generated power increase margin $[k+H]$=(target generated power $[k]$−actual generated power $[k]$)×(1−exp (−control period/time constant $A)^H$) (3)

where k is current calculation timing and H is the number of steps of the control period.

The value H herein which determines a parameter after the predetermined time is set to an integral multiple of the lower limit value while defining 1 as the lower limit. If the dynamic characteristic of the driving motor cannot be regarded as the primary function, then the target generated power increase margin may be calculated by use of a function having a higher order than the primary order. Meanwhile, since the flowchart is executed at a 10-microsecond period in this embodiment, the control period is equal to 0.01 on the second time scale.

Figure 20:
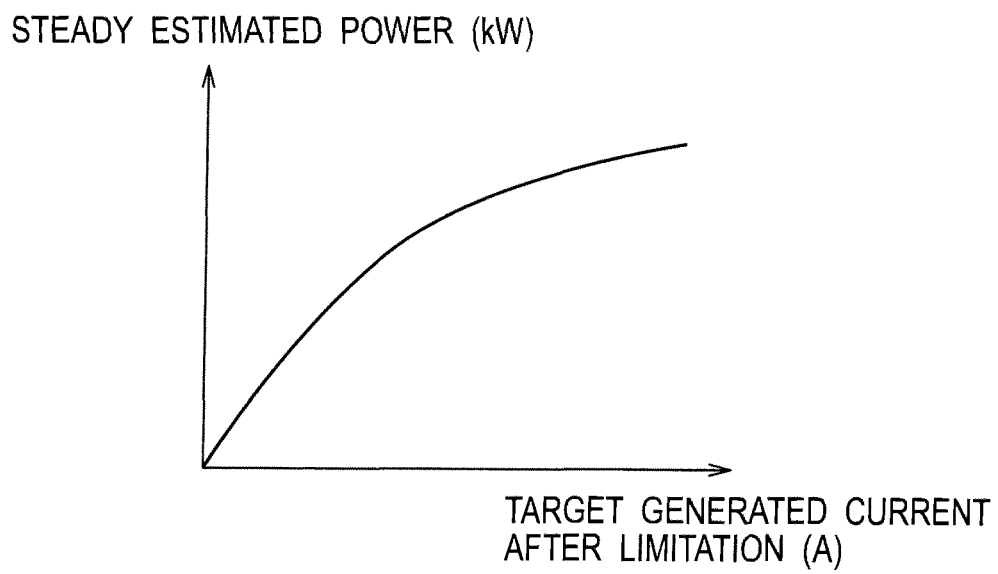
FIG. 20 is a view showing table data for calculating estimated stationary power based on target generated current after limitation.

Next, in step S802, steady estimated power is calculated by converting the target generated power after limitation into the power based on the IV characteristic in the steady state while using, as an input, the target generated current after limitation being the output from the current limiting unit 37. Here, the steady estimated power is calculated based on table data in FIG. 20. The table data are set up by means of desktop design and experimental measurement of the IV characteristic of the upper limit with consideration given to manufacturing variation and the like among the IV characteristics in the steady state of the fuel cell stack 1. As described above, by setting the upper limit characteristic, it is possible to achieve the response in which the actual generated power hardly overshoots the target generated power. Hence the driving motor can be activated without discomfort in response to an acceleration request from a driver. Meanwhile, instead of using the table data, it is also possible to use map data obtained by further adding a calculating formula or operating temperature sensitivity of the IV characteristic of the fuel cell stack 1, and the like.

Next, in step S803, dynamic estimated power representing an estimated value of the generated power in the transient state is calculated by use of a transient response model configured to estimate a transient response of the generated power while using the steady estimated power calculated in step S802 as an input. Here, the transient response model represents a dynamic characteristic while using, as an input, the target generated current after limitation being the output from the current limiting unit 37 of the controller 3 and using, as an output, the actual generated power being the output from the actual generated power calculating unit 32. Here, the dynamic estimated power in the case of regarding this dynamic characteristic as a primary delay characteristic of a time constant B is calculated by use of the following formula (4).

Dynamic estimated power $[k]$=(1−exp (−control period/time constant $B$))×steady generated power $[k-1]$+exp (−control period/time constant $B$))× dynamic estimated power $[k-1]$ (4)

Here, if the transient response model cannot be regarded as the primary function, then it is possible to calculate the dynamic estimated power by use of a function having a higher order than the primary order.

Figure 21:
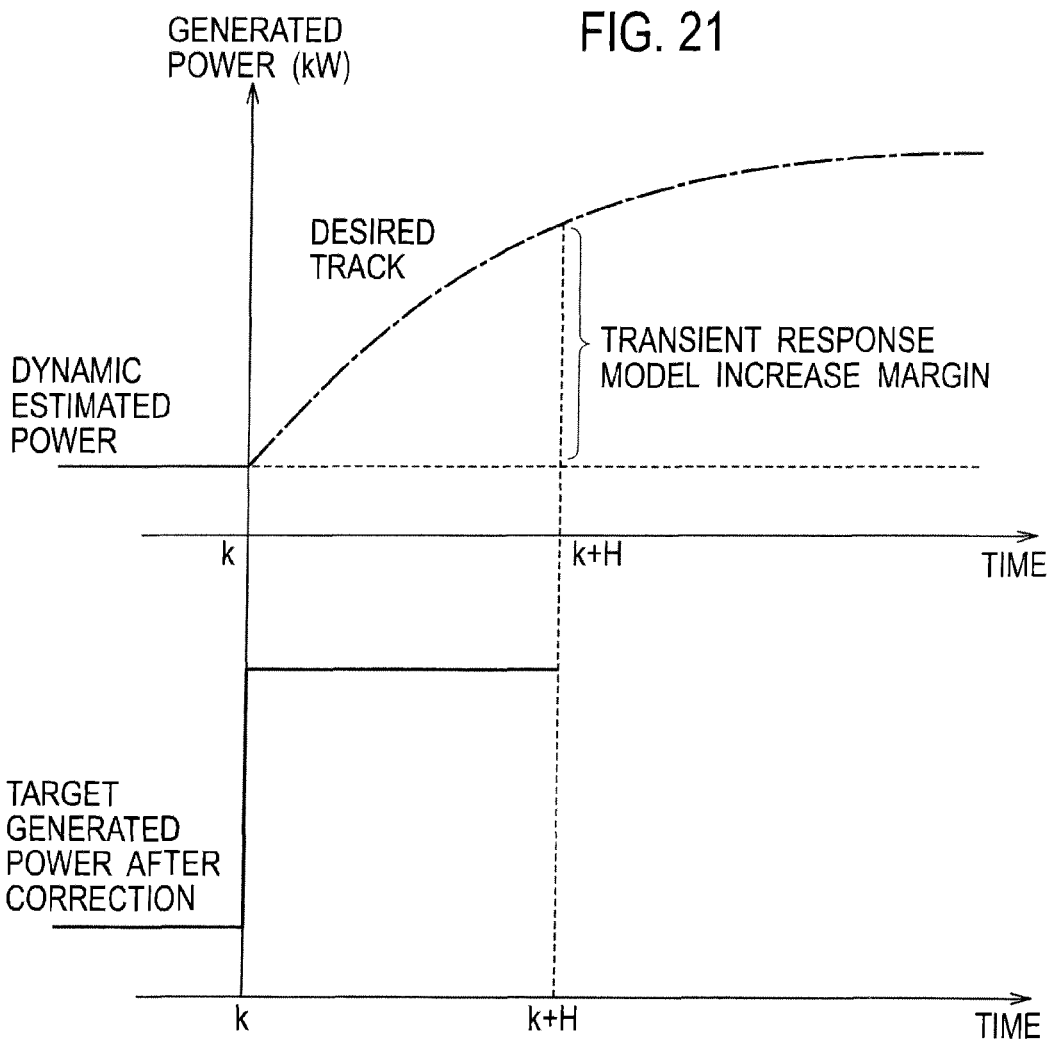
FIG. 21 is a view to explain an example of a calculation method for target generated power after correction.

Next, in step S804, target generated power after correction in which the actual generated power conforms to the target generated power is calculated by use of the target generated power increase margin calculated in step S801 and the dynamic estimated power calculated in step S803. A detailed calculation method here will be described by using FIG. 21. First, a transient response model increase margin (to be calculated by a transient response model increase margin calculating unit 348) which is an increase margin of the dynamic estimated power after predetermined time [k+H] can be expressed by the following formula (5).

Transient response model increase margin [k+H]=dynamic estimated power [k+H]−dynamic estimated power [k]     (5)

Moreover, it is also possible to express the following formula (6) when the foregoing formula (5) is replaced by use of the above-described transient response model of the generated power.

Transient response model increase margin [k+H] dynamic estimated power [k]×exp (−control period/time constant B)$^H$+target generated power after correction×(1−exp(−control period/time constant B)$^H$)−dynamic estimated power [k]     (6)

The target generated power after correction is calculated so that the transient response model increase margin obtained in the above formula (6) is equal to (conforms to) the target generated power increase margin calculated in step S801.

Figure 22:
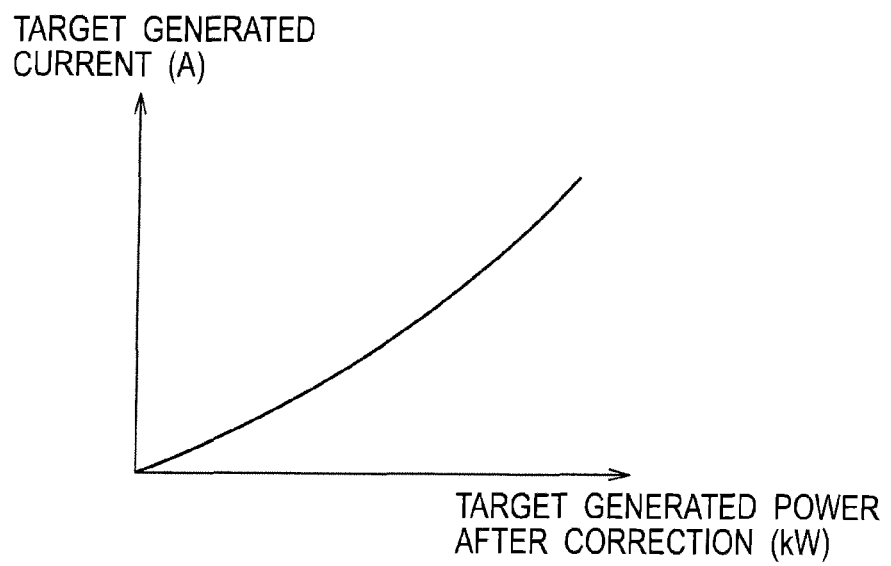
FIG. 22 is a view showing table data for calculating a target generated current based on target generated power after correction.

Next, in step S805, the target generated current converted into the current is calculated based on the IV characteristic in the steady state while using the target generated power after correction calculated in step S804 as an input. Here, the target generated current is calculated based on table data in FIG. 22. The table data are set up based on the IV characteristic which is the same as the IV characteristic of the table data used in step S802. As a result, it is possible to obtain the target generated current which does not bring about the steady-state deviation between the target generated power and the actual generated power. Hence the processing by the target generated current calculating unit 34 is completed.

Figure 23:
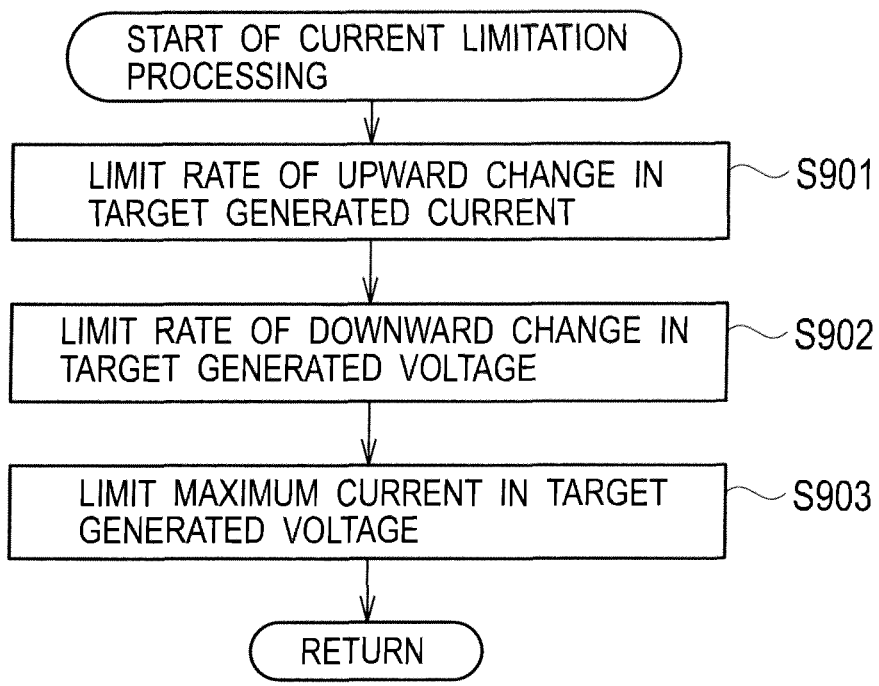
FIG. 23 is a flowchart showing details of current limitation processing in step S207 of FIG. 6.

FIG. 23 is a flowchart showing details of processing by the current limiting unit 37 in step S207 of FIG. 6.

First, in step S901, the current limiting unit 37 limits the target generated current calculated in step S206 of FIG. 6 based on a deviation between current calculation timing [k] and previous timing [k−1] and the limit value for the rate of upward change calculated in step S204 of FIG. 6 as shown in the following formula (7) and the following formula (8).

If target generated current [k]−target generated current [k−1]>limit value of rate of upward change [k], target generated current TA1 [k]=target generated current [k−1]+limit value of rate of upward change [k]     (7)

If target generated current [k]−target generated current [k−1]≤limit value of rate of upward change [k], target generated current TA1 [k]=target generated current [k]     (8)

Next, in step S902, the target generated current TA1 calculated in step S901 is limited based on the deviation between the current calculation timing [k] and the previous timing [k−1] and on the limit value for the rate of downward change calculated in step S204 of FIG. 6 as shown in the following formula (9) and the following formula (10).

If target generated current TA1 [k]−target generated current TA1 [k−1]<limit value of rate of downward change [k], target generated current TA2 [k]=target generated current TA1 [k−1]+limit value of rate of downward change [k]     (9)

If target generated current TA1 [k]−target generated current TA2 [k−1] limit value of rate of downward change [k], target generated current TA2 [k]=target generated current TA1 [k]     (10)

Next, in step S903, the target generated current TA2 calculated in step S902 is limited based on the upper limit value of the target generated current (the maximum current limit) calculated in step S205 of FIG. 6 as shown in the following formula (11) and the following formula (12).

If target generated current TA2 [k]>maximum current limit [k], target generated current TA3 [k]=maximum current limit [k]     (11)

If target generated current TA2 [k] maximum current limit [k], target generated current TA3 [k]=target generated current TA2 [k]     (12)

Hence the processing by the current limiting unit 37 completed.

Figure 24:
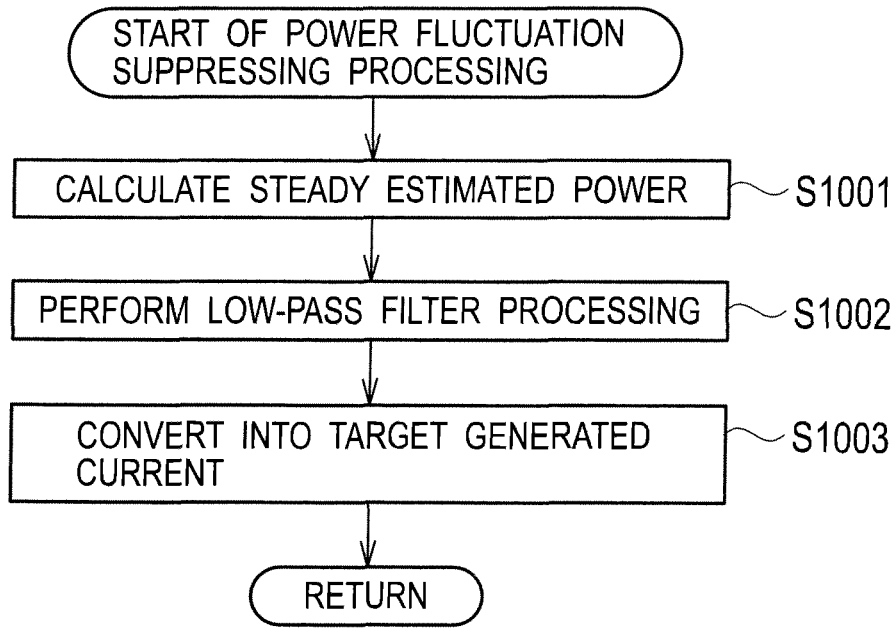
FIG. 24 is a flowchart showing details of power fluctuation suppressing processing in step S208 of FIG. 6.

FIG. 24 is a flowchart showing details of processing by the power fluctuation suppressing unit 38 in step S208 of FIG. 6.

First, in step S1001, the power fluctuation suppressing unit 38 calculates the steady estimated power by converting the target generated power after limitation into the power based on the IV characteristic in the steady state while using, as an input, the target generated current after limitation being the output from the current limiting unit 37. The same table data (FIG. 20) as the IV characteristic in the steady state used in step S802 of FIG. 18 is also used herein.

Figure 25:
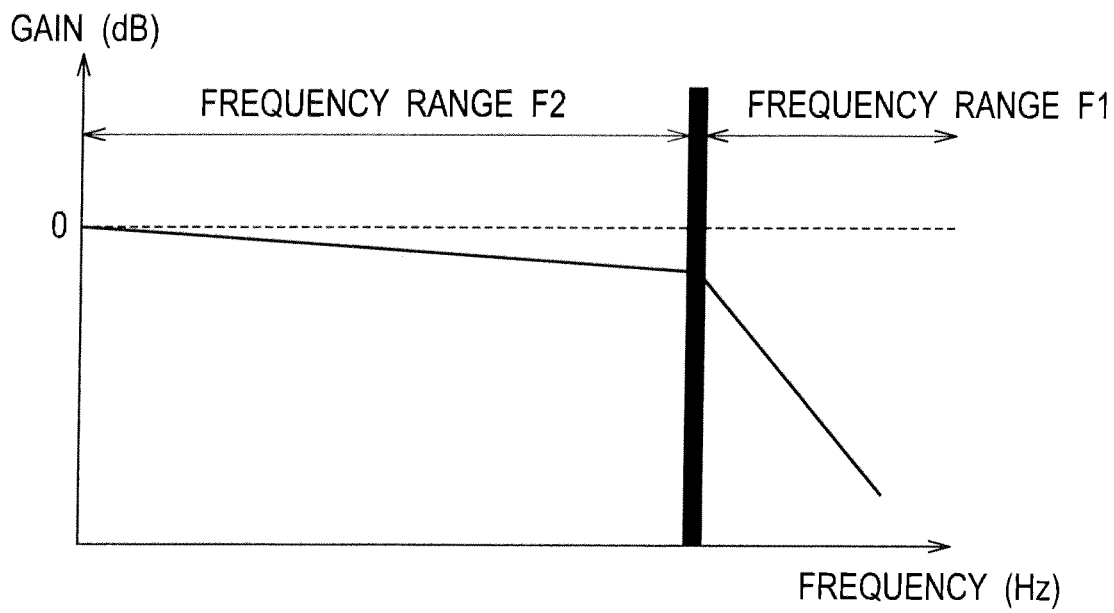
FIG. 25 is a view showing characteristics of a low-pass filter.

Next, in step S1002, the steady estimated power calculated in step S1001 is allowed to pass through a low-pass filter. Characteristics of the low-pass filter used herein will be described by using FIG. 25. First, this low-pass filter is set to reduce a gain characteristic in a frequency region F1 down to a sufficiently low level. In other words, this low-pas filter reduces a peak gain possessed by the fuel cell in the frequency region F1 (a high frequency region) down to a predetermined value. Here, the frequency region F1 is the frequency region in which a fluctuation in the generated power due to an instantaneous change of the clogging of the generated water in the membrane of the fuel cell stack 1 is increased by the calculation of the target generated current in step S205 of FIG. 6. For example, a frequency band of a fluctuation component of the actual generated power in the steady state under a low-temperature environment is checked by an experiment and is set to this frequency band. Next, a frequency region that satisfies a transient request of the driving motor connected to the fuel cell stack 1 is included in a frequency region F2. In this way, it is possible to activate the driving motor without discomfort in response to the acceleration request from the driver.

Next, in step S1003, the steady estimated power subjected to the low-pass filter processing in step S1002 is converted into the current (the target generated current) based on the IV characteristic in the steady state. The same table data (FIG. 22) as the IV characteristic in the steady state used in step S805 of FIG. 18 is also used herein. As described above, the power fluctuation suppressing unit 38 is configured to allow the target generated current after limitation being the output from the current limiting unit 37 to pass through the low-pass filter after conversion into the power. Accordingly, it is possible to estimate the transient response model of the generated power used when the target generated current calculating unit 34 calculates the target generated current by use of the low-pass filter set up in step S1002, and also to obtain an effect of improving estimation accuracy of the transient response model. Hence the processing by the power fluctuation suppressing unit 38 is completed.

Figure 26:
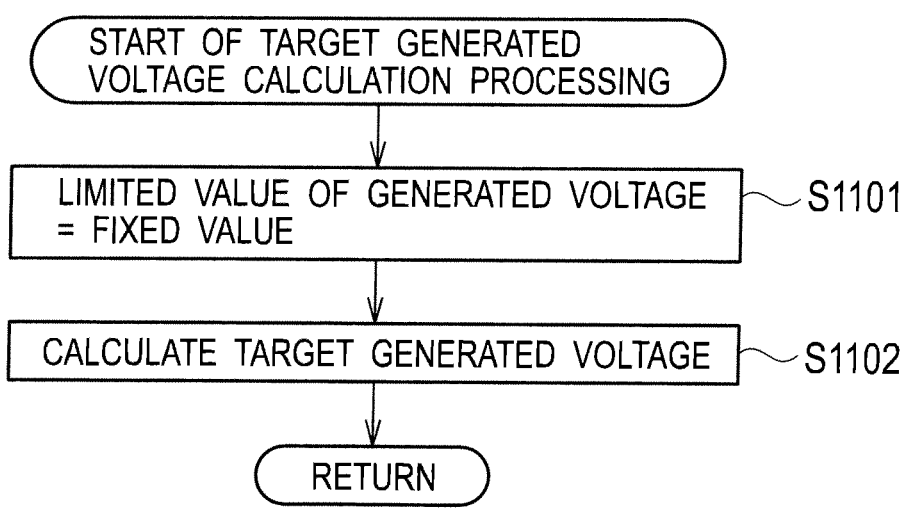
FIG. 26 is a flowchart showing details of target generated voltage calculation processing in step S209 of FIG. 6.

FIG. 26 is a flowchart showing details of processing by the target generated voltage calculating unit 39 in step S209 of FIG. 6.

First, in step S1101, the target generated voltage calculating unit 39 sets up a lower limited value of the generated voltage of the target generated voltage to be controlled by the power control device 2. The same value as the generated voltage lower limit value used in the process of calculating the maximum current limit in step S205 of FIG. 6 is also used herein.

Next, in step S1102, the target generated voltage to follow the actual generated current detected by the current sensor 22 is calculated for the target generated current which has been subjected to the low-pass filter processing by the power fluctuation suppressing unit 38. Here, the target generated voltage is determined by carrying out feedback control based on the deviation between the target generated current and the actual generated current, for example. Note that this feedback control can be structured by well-known methods including the PI control, the model reference adaptive control, and the like. In this case, the limitation is imposed so that the target generated voltage does not fall below the lower limit value set up in step S1101. Hence the processing by the target generated voltage calculating unit 39 is completed.

As described in detail with reference to the specific example, according to the fuel cell system 100 of this embodiment, it is possible to obtain the following effects by performing the power generation control by the controller 3 using the present invention.

As the characteristic of the fuel cell stack 1 under the low-temperature environment, a significant decrease in power generation efficiency in the transient state occurs when the current is taken out of the fuel cell stack 1 rapidly in a short time. This is probably because the oxygen diffusion performance degrades under a situation where the water clogging occurs in pores of the cathode catalytic layer, for example. Here, in the fuel cell system 100 of this embodiment, the controller 3 is configured to calculate the limit values for the rate of change in the target generated current to be taken out of the fuel cell stack 1 based on the operating condition parameter (such as the temperature detection value by the coolant temperature sensor 20) correlated with the operating temperature of the fuel cell stack 1, and to limit the target generated current so that the rate of change in the target generated current does not exceed the limit values. Therefore, it is possible to perform the control so that the current is not taken out of the fuel cell stack 1 too rapidly with consideration given to the condition of resolving the water clogging caused by the rise in temperature inside the fuel cell stack 1. Hence it is possible to cause the actual generated power to follow the target generated power accurately while the significant decrease in power generation efficiency in the transient state can be prevented even when the fuel cell stack 1 generates power under the low-temperature environment.

Meanwhile, a margin of decrease in power generation efficiency in the transient state in the case of taking the current out of the fuel cell stack 1 becomes smaller as the operating temperature of the fuel cell stack 1 becomes higher. This is probably because the water clogging in the cathode catalytic layer is gradually resolved by the rise in temperature inside the fuel cell stack 1, for example. Here, in the fuel cell system 100 of this embodiment, the controller 3 is configured to set the limit value for the rate of upward change in the target generated current to a higher value along with the rise in the temperature detection value (such as the temperature detection value by the coolant temperature sensor 20) correlated with the operating temperature of the fuel cell stack 1. Accordingly, it is possible to cause the actual generated power to follow the target generated power accurately while the fastest transient performance can be achieved within a range where the significant decrease in power generation efficiency does not occur.

Meanwhile, there is a risk that the IV performance in the steady state degrades due to freezing of generated water, the clogging of the generated water and the like at the time of low-temperature power generation, and that a steady deviation of the actual generated power from the target generated power occurs even when the limit value for the rate of upward change in the target generated current is observed. Moreover, this degradation in the IV performance also varies depending on arrangement variations among the fuel cells, conditions of negligence or the like, and is therefore difficult to estimate. Here, in the fuel cell system 100 of this embodiment, the controller 3 is configured to calculate the target generated current so as to eliminate the deviation between the target generated power and the actual generated power based on the target generated current after the limitation imposed on the rate of change in the current. Accordingly, it is possible to calculate the target generated current properly with consideration given to the degradation in the IV performance when the fuel cell stack 1 performs power generation under the low-temperature environment, and thereby to cause the actual generated power to follow the target generated power accurately without occurrence of the steady deviation due to the degradation in the IV performance.

Moreover, when the rate of change in the target generated current is limited by carrying out the feedback control to cause the actual generated power to follow the target generated power, the feedback control including an integrator, such as the PI control, fails to properly perform calculation with the integrator in the case of limiting the rate of change in the target generated current. Hence it is not possible to cause the actual generated power to follow a change in the target generated power in a short time. Otherwise, there is a risk that the actual generated power overshoots the target generated power. When the overshoot occurs, there is a possibility that the actually generated power of the electrical load device such as the driving motor connected to the fuel cell stack 1 significantly differs from the target generated power and an overcurrent flows inside the secondary cell and thereby a protection mode is activated, in a system having a secondary cell, for example. On the other hand, if the integrator is not provided, there is a possibility of blocking a prompt rise in temperature by self-heating associated with power generation under the low-temperature environment because the actual generated power causes the steady deviation from the target generated power. Here, in the fuel cell system 100 of this embodiment, the controller 3 is configured to calculate the target generated power increase margin supposed to be increased for the actual generated power after the predetermined time by use of the deviation between the target generated power and the actual generated power, to input the target generated power after the limitation imposed on the rate of change in the current, and to use the transient response model of the generated power, thereby calculating the target generated current so that the transient response model increase margin after the predetermined time is equal to (equivalent to) the target generated power increase margin. Hence it is possible to calculate the target generated current continuously even when the rate of change in the current is limited. As a result, even in the scene where the rate of upward change in the target generated current is limited, the actual generated power can conform to the target generated power while following in the neighborhood of the limited rate of change and overshooting are suppressed.

Moreover, in the case of power generation under a low-temperature environment and the like, there is a possibility of an instantaneous fluctuation in the IV characteristic due to an instantaneous change in the condition of the water clogging in the catalytic layer. As a consequence, the fluctuation in the actual generated power may be promoted. Here, in the fuel cell system of this embodiment, the controller 3 is configured to set up the low-pass filter to remove a high-frequency component in the fluctuation in the actual generated power due to the instantaneous change in the condition of the water clogging in the catalytic layer, and to subject the target generated current after limiting the rate of change in the current to the low-pass filter processing. Accordingly, it is possible to suppress the fluctuation in the actual generated power effectively and to set up the transient response model of the generated power based on the low-pass filter thus set up. Hence the accuracy of the transient response model of the generated power is improved for the transient response of the actual generated power. As a result, even in the case where the instantaneous fluctuation occurs in the actual generated power, the actual generated power can conform to follow the target generated power while the amount of overshoot of the actual generated power is suppressed to the minimum.

Moreover, a fluctuation component such as measurement noise may be added in an attempt to calculate the target generated power accurately based on a load parameter detection value of the electrical load device, and a deviation between the target generated power and the actual generated power may be caused in the scene where the actual generated power is following in the neighborhood of the target generated power. Here, in the fuel cell system 100 of this embodiment, the controller 3 is configured to set the limit value for the rate of downward change so as to prevent the target generated value from differing from the actual generated power by an amount equal to or above the predetermined value with consideration given to the limitation of the rate of upward change in the target generated current, and to limit not only the upward rate but also the downward rate of the target generated power. Accordingly, even when the fluctuation component is added to the target generated power due to the measurement noise of the actual generated power and the like, it is still possible to cause the actual generated power to follow the target generated power without any steady deviation.

Moreover, as described previously, there is the case where the IV performance of the fuel cell stack 1 is degraded due to freezing of the generated water, clogging of the generated water, and the like under the low-temperature environment. This degradation in the IV performance varies depending on the arrangement variations among the fuel cells, the conditions of negligence or the like, and is therefore difficult to estimate. For this reason, even when the rate of upward change in the target generated current is limited, there is still a possibility that a voltage changes at which the connected electrical load device cannot activate normally, or that deterioration occurs due to the polarity inversion of the cell voltage in the fuel cells. Here, in the fuel cell system 100 of this embodiment, the controller 3 is configured to calculate the target generated voltage so as to prevent the generated voltage of the fuel cell stack 1 from falling below the predetermined lower limit value. Accordingly, it is possible to maintain the lower voltage so as not to cause the voltage at which the connected electrical load device cannot activate normally, or not to cause deterioration due to the polarity inversion of the cell voltage in the fuel cells. Moreover, in order not to limit the target generated current more than necessary due to the fluctuation component of the actual generated power, the upper limit value (the maximum current limit) of the target generated current is calculated based on the value which is obtained by dividing the value being selected from the values of the actual generated power before the predetermined time by the lower limit value of the target generated voltage, and thereby to limit the maximum value of the target generated current. Therefore, it is possible to follow the change in the target generated power in a short time even when the generated voltage is limited. As a consequence, it is possible to cause the actual generated power to follow the target generated power accurately within the range where deterioration due to the polarity inversion of the voltage in the fuel cells is prevented, or where the voltage is prevented from falling below the voltage that affects the operation of the electrical load device connected to the fuel cell stack 1.

Moreover, as the fuel cell stack 1 experiences the reduced state of power generation under the low-temperature environment, there is a tendency that the decrease in power generation efficiency becomes more prominent than the case with no experience. This is probably because of an influence of the water getting clogged more easily in the pores in the cathode catalytic layer due to power generation in a situation with a lower water drainage performance at a low temperature, for example. Here, the fuel cell system 100 of this embodiment is configured to judge the state of power generation of the fuel cell stack 1 at a start-up, and to carry out the limitation of the target generated current by use of the current limiting unit 37 only when the judgment is made that there is the possibility of the reduced state of power generation. Accordingly, it is possible to cause the actual generated power to follow the target generated power accurately in a shorter period in the scene where the decrease in power generation efficiency in the transient state does not occur prominently.

The fuel cell system according to the embodiment of the present invention has been described above in detail. However, the above-described embodiment merely exemplifies a certain application example of the present invention and is not intended to limit the technical scope of the present invention within the contents described in the embodiment. That is to say, the technical scope of the present invention is not limited only to the specific technical matters described in the embodiment, but is supposed to encompass various other modifications, changes, alternative techniques, and so forth which can be easily derived from this disclosure.

The entire contents of Japanese Patent Application No. 2008-283149 (filed on Nov. 4, 2008) are incorporated herein by reference, in order to take some protection against translation errors or omitted portions.

The contents of the present invention have been described above with reference to the embodiment. However, it is obvious to those skilled in the art that the present invention is not limited only to the description made above and various modifications and improvements are possible.

Industrial Applicability

According to the present invention, it is possible to limit a rate of change in a target generated current with consideration given to a condition of resolving water clogging caused by a rise in temperature inside a fuel cell. Hence it is possible to

The invention claimed is:

1. A fuel cell system comprising:
a fuel cell;
a DC/DC converter being disposed between the fuel cell and an electrical load device and configured to control taking a power out of the fuel cell;
a current sensor being disposed between the fuel cell and the electrical load device and configured to detect a generated current of the fuel cell; and
a power generation control device configured to control the DC/DC converter;
wherein the power generation control device comprises:
a target generated power calculating unit configured to calculate a target generated power of the fuel cell, based on a load condition of the electrical load device connected to the fuel cell;
a target generated current calculating unit configured to calculate a target generated current to be taken out of the fuel cell, based on the target generated power;
a current change rate limit value calculating unit configured to calculate a limit value for a rate of upward change in the target generated current, based on a detection value of a temperature correlated with an operating temperature of the fuel cell; and
a current limiting unit configured to limit the DC/DC converter based on the target generated current and the generated current detected by the current sensor so that the rate of change in the target generated current does not exceed the limit value calculated by the current change rate limit value calculating unit,
wherein the limit value for the rate of upward change in the target generated current calculated by the current change rate limit value calculating unit rises in accordance with an increase in the detection value of the temperature correlated with the operating temperature of the fuel cell.

2. The fuel cell system according to claim 1, the power generation control device further comprising:
an actual generated power calculating unit configured to calculate an actual generated power of the fuel cell, based on a detection value of a generated current and a detection value of a generated voltage of the fuel cell, wherein
the target generated current calculating unit is configured to calculate the target generated current, based on an output from the current limiting unit and on a deviation between the target generated power and the actual generated power, so that the actual generated power conforms to the target generated power.

3. The fuel cell system according to claim 2, wherein
the target generated current calculating unit includes:
a target generated power increase margin calculating unit configured to calculate a target generated power increase margin of the actual generated power based on the deviation between the target generated power and the actual generated power, the target generated power increase margin being employed for a predetermined time period; and
a transient response model increase margin calculating unit configured to calculate a transient response model increase margin after the predetermined time, based on the output from the current limiting unit and on a transient response model of generated power, and the target generated current calculating unit is configured to calculate the target generated current so that the target generated power increase margin conforms to the transient response model increase margin.

4. The fuel cell system according to claim 1, the power generation control device further comprising:
a power fluctuation suppressing unit configured to cause an output from the current limiting unit to pass through a low-pass filter configured to reduce a peak gain to a predetermined value, the peak gain possessed by the fuel cell in a high-frequency range.

5. The fuel cell system according to claim 2, wherein
the load condition of the electrical load device is a detection value of a load parameter correlated with a load, and
the current change rate limit value calculating unit is configured to calculate a limit value for a rate of downward change in the target generated current so that the target generated power and the actual generated power are prevented from differing by an amount equal to or above a predetermined value due to a fluctuation component possessed by the target generated power calculated based on the detection value of the load parameter.

6. The fuel cell system according to claim 2, the power generation control device further comprising:
a target generated voltage calculating unit configured to calculate a target generated voltage of the fuel cell based on the target generated current so that the generated voltage of the fuel cell does not fall below a predetermined lower limit value; and
a current upper limit value calculating unit configured to calculate an upper limit value for the target generated current, based on a value obtained by dividing a value selected from the actual generated power before a predeteiniined time by the predetermined lower limit value of the generated voltage, wherein
the current limiting unit is configured to limit the target generated current so that a maximum value of the target generated current does not exceed the upper limit value calculated by the current upper limit value calculating unit.

7. The fuel cell system according to claim 1, wherein
a state of power generation of the fuel cell at a start-up is judged based on the detecting value of a temperature correlated with the operating temperature of the fuel cell and limitation of the target generated current is carried out by the current limiting unit when a judgment is made that the state of power generation has possibly been reduced.

8. A power generation control method for a fuel cell system having
a fuel cell;
a DC/DC converter being disposed between the fuel cell and an electrical load device and configured to control taking a power out of the fuel cell;
a current sensor being disposed between the fuel cell and the electrical load device and configured to detect a generated current of the fuel cell; and
a power generation control device configured to control the DC/DC converter;
wherein the power generation control device comprises:
a target generated power calculating unit configured to calculate a target generated power of the fuel cell, based on a load condition of the electrical load device connected to the fuel cell;
a target generated current calculating unit configured to calculate a target generated current to be taken out of the fuel cell, based on the target generated power;

a current change rate limit value calculating unit configured to calculate a limit value for a rate of upward change in the target generated current, based on a detection value of a temperature correlated with an operating temperature of the fuel cell; and a current limiting unit configured to limit the DC/DC converter based on the target generated current and the generated current detected by the current sensor so that the rate of change in the target generated current does not exceed the limit value calculated by the current change rate limit value calculating unit, the method comprising:

the limit value for the rate of upward change in the target generated current sing in accordance with an increase in the detection value of the temperature correlated with the operating temperature of the fuel cell; and performing a limitation to generate power in such a way that a target generated current value to be determined for a predetermined required load at a low-temperature start-up is smaller than a target generated current value to be determined for the required load at a warm-up.

9. The fuel cell system according to claim 1, wherein:
the current limiting unit is configured to perform limitation to generate power in such a way that a target generated current value to be determined for a predetermined required load at a low-temperature start-up is smaller than a target generated current value to be determined for the required load at a warm-up.

10. A power generation control method for a fuel cell system having a fuel cell;

a DC/DC converter being disposed between the fuel cell and an electrical load device and configured to control taking a power out of the fuel cell;

a current sensor being disposed between the fuel cell and the electrical load device and configured to detect a generated current of the fuel cell; and a power generation control device configured to control the DC/DC converter;

wherein the power generation control device comprises:

a target generated power calculating unit configured to calculate a target generated power of the fuel cell, based on a load condition of the electrical load device connected to the fuel cell;

a target generated current calculating unit configured to calculate a target generated current to be taken out of the fuel cell, based on the target generated power;

a current change rate limit value calculating unit configured to calculate a limit value for a rate of upward change in the target generated current, based on a detection value of a temperature correlated with an operating temperature of the fuel cell; and a current limiting unit configured to limit the DC/DC converter based on the target generated current and the generated current detected by the current sensor so that the rate of change in the target generated current does not exceed the limit value calculated by the current change rate limit value calculating unit, the method comprising:

calculating the target generated power of the fuel cell, based on the load condition of the electrical load device connected to the fuel cell;

calculating the target generated current to be taken out of the fuel cell, based on the target generated power;

calculating the limit value for the rate of upward change in the target generated current, based on the detection value of a temperature correlated with the operating temperature of the fuel cell; and limiting the target generated current so that the rate of upward change in the target generated current does not exceed the limit value obtained by the calculating; and the limit value for the rate of upward change in the target generated current rising in accordance with an increase in the detection value of the temperature correlated with the operating temperature of the fuel cell.

11. A fuel cell system comprising:

a fuel cell;

a DC/DC converter being disposed between the fuel cell and an electrical load device and configured to control taking a power out of the fuel cell;

a current sensor being disposed between the fuel cell and the electrical load device and configured to detect a generated current of the fuel cell; and a power generation control device configured to control the DC/DC converter;

wherein the power generation control device comprises:

target generated power calculating means for calculating a target generated power of the fuel cell, based on a load condition of the electrical load device connected to the fuel cell;

target generated current calculating means for calculating a target generated current to be taken out of the fuel cell, based on the target generated power;

current change rate limit value calculating means for calculating a limit value for a rate of upward change in the target generated current based on a detection value of a temperature correlated with an operating temperature of the fuel cell; and current limiting means for limiting the DC/DC converter based on the target generated current and the generated current detected by the current sensor so that the rate of change in the target generated current does not exceed the limit value calculated by the current change rate limit value calculating means, wherein the limit value for the rate of upward change in the target generated current calculated by the current change rate limit value calculating means rises in accordance with an increase in the detection value of the temperature correlated with the operating temperature of the fuel cell.

* * * * *